(12) United States Patent
Polk, Jr.

(10) Patent No.: US 7,874,125 B2
(45) Date of Patent: Jan. 25, 2011

(54) MOLDED SUPPORT BEAM

(75) Inventor: Dale E. Polk, Jr., Titusville, FL (US)

(73) Assignee: LRM Industries International, Inc, Rockledge, FL (US)

( * ) Notice: Subject to any disclaimer, the term of this patent is extended or adjusted under 35 U.S.C. 154(b) by 291 days.

(21) Appl. No.: 12/033,934

(22) Filed: Feb. 20, 2008

(65) Prior Publication Data

US 2008/0229706 A1 Sep. 25, 2008

Related U.S. Application Data

(60) Provisional application No. 60/905,752, filed on Mar. 8, 2007.

(51) Int. Cl.
*E04C 3/00* (2006.01)
*E04C 3/29* (2006.01)
*E04C 5/07* (2006.01)
(52) U.S. Cl. .............................. 52/836; 52/831; 52/843; 52/846; 52/847
(58) Field of Classification Search ................... 52/831, 52/834, 835, 836, 837, 838, 839, 840, 841, 52/843, 844, 851, 852, 853, 855; D25/119, D25/124, 136, 164; 108/57.25; 312/140; 248/346.02
See application file for complete search history.

(56) References Cited

U.S. PATENT DOCUMENTS

| | | | | |
|---|---|---|---|---|
| 3,696,761 A | * | 10/1972 | Brown ........................ | 108/56.3 |
| 4,000,704 A | * | 1/1977 | Griffin, Jr. .................. | 108/53.1 |
| 4,234,092 A | | 11/1980 | Axel | |
| 4,308,706 A | | 1/1982 | Rijnders | |
| 4,318,351 A | * | 3/1982 | Munk .......................... | 108/901 |
| D267,126 S | * | 11/1982 | Jonebrant .................... | D34/38 |
| 4,614,278 A | | 9/1986 | Gerhard | |
| 4,848,053 A | | 7/1989 | Clausen | |
| 4,955,956 A | | 9/1990 | Gerhard | |
| 5,022,205 A | | 6/1991 | Ford | |
| 5,257,871 A | | 11/1993 | Zona et al. | |
| 5,392,946 A | | 2/1995 | Holbrook et al. | |
| 5,513,890 A | | 5/1996 | Christensen | |
| 5,526,945 A | | 6/1996 | Clark et al. | |

(Continued)

*Primary Examiner*—Brian E Glessner
*Assistant Examiner*—Joseph J Sadlon
(74) *Attorney, Agent, or Firm*—Michael A. Ervin; M. A. Ervin & Associates

(57) ABSTRACT

A molded support beam (1, 2, 3) that includes an elongated lower portion (11) an elongated upper portion (14) and at least one elongated flange (17, 18) extending upwardly from the elongated upper portion, is described. The elongated lower portion (11) includes at least three separate downwardly extending supports (e.g., 29, 32, 35) which together define at least two open-bottomed transverse openings (e.g., 41, 44), at least one of which being an arched open-bottomed transverse opening (e.g., 219, 234, 249). The elongated upper portion (14) includes a longitudinal passage (68), and a ledge (92) that extends horizontally outward from a second vertical side (56) thereof. An elongated hollow support tube (74) resides within the longitudinal passage (68) of the elongated upper portion (14). The elongated lower portion (11), elongated upper portion (14) and the elongated flange(s) (17, 18) are substantially continuous and together form a substantially unitary structure, and are each typically fabricated from a plastic material (e.g., thermoplastic polyethylene), and the elongated hollow support tube (74) is typically fabricated from metal. The molded support beam (e.g., 1, 2, 3) may be used as a lower molded support beam in numerous structures, such as shipping containers (e.g., ISO Containers having lengths from 6.1 to 16.2 m).

25 Claims, 13 Drawing Sheets

U.S. PATENT DOCUMENTS

| | | |
|---|---|---|
| 5,807,047 A | 9/1998 | Cox |
| 6,123,213 A | 9/2000 | Clive-Smith et al. |
| 6,209,464 B1 * | 4/2001 | Elder ..................... 108/53.3 |
| 6,299,246 B1 | 10/2001 | Tomka |
| 9,246,131 | 10/2001 | Tomka |
| 6,317,981 B1 | 11/2001 | Clive-Smith |
| 6,508,182 B1 | 1/2003 | Smorgan et al. |
| 6,598,847 B2 | 7/2003 | Doucet et al. |
| 6,749,108 B2 | 6/2004 | Naughton et al. |
| 6,811,195 B2 * | 11/2004 | Klocke et al. ............. 52/309.4 |
| 2003/0070594 A1 | 4/2003 | Isle et al. |
| 2006/0075939 A1 * | 4/2006 | Shuert .................. 108/57.25 |

* cited by examiner

MOLDED SUPPORT BEAM

CROSS REFERENCE TO RELATED PATENT APPLICATION

The present nonprovisional patent application is entitled to and claims the right of priority under 35 U.S.C. §119(e) of U.S. Provisional Patent Application Ser. No. 60/905,752, filed 8 Mar. 2007.

FIELD OF THE INVENTION

The present invention relates to a molded support beam that includes an elongated lower portion, an elongated upper portion and at least one elongated flange extending upwardly from the upper portion. The lower portion includes at least three downwardly extending supports that define at least two transverse openings having open bottoms, at least one of which being an arched transverse opening. The upper portion includes an upper surface, a longitudinal passage extending substantially the whole length of the upper portion, and a ledge that extends horizontally outward from a second vertical surface thereof. The molded support beam also includes an elongated hollow support tube residing within the longitudinal passage of the upper portion. The lower portion, upper portion and elongated flange(s) form a substantially continuous unitary structure, and are each preferably molded from a plastic material. The elongated hollow support tube is typically fabricated from metal.

BACKGROUND OF THE INVENTION

Support beams may be used in numerous structures and assemblies, such as containers, shipping containers, storage structures and temporary dwellings. In the case of shipping containers, the support beams, and in particular the lower support beams, typically provide support for both floor and wall components, and indirect support for ceiling components as their weight is transferred down through the wall components. In addition to providing support for floor and wall components, the lower support beams, and in particular the longitudinal lower support beams generally must also provide or be fitted with a means of lifting the shipping container, such as apertures for lift forks and/or lifting straps. Still further, the lower support beams of a shipping container must also provide support for the weight of items stowed within the container.

To maintain the structural integrity of the shipping container, the lower support beams, and in particular the lower longitudinal support beams, are also required to exhibit a minimum of deformation (e.g., vertical and/or torsional deflection) between loaded and unloaded states. If the lower support beams undergo, for example, vertical and/or torsional deflection between loaded and unloaded states, the sidewalls, floor and ceiling components may move relative to each other resulting in opening of sidewall, floor and/or ceiling seams, thus exposing the contents of the container to external elements, such as rain, snow, sea water, insects and rodents.

To meet the numerous requirements discussed above, lower support beams are typically fabricated from materials such as metal and/or wood. Support beams fabricated from metal and wood, while typically sturdy, can be undesirably heavy, requiring increased fuel costs associated with transporting the shipping container. In addition, metal support beams are subject to rusting, and wood beams are subject to rot, and as such must typically have protective coatings applied thereto. Due to the extensive and often rough handling that shipping containers undergo, coatings applied to lower support beams are usually quickly worn off, exposing the underlying beam substrate to degrative environmental conditions that may lead to rust and/or rot.

Support beams may be fabricated from plastic. In order, however, to meet weight support and minimal deflection requirements, plastic support beams typically have a weight that is similar to, if not greater than, that of the metal and wood beams they are designed to replace.

It would be desirable to develop a molded support beam that provides a desirable combination of light weight and high strength. In addition, it would be desirable that such newly developed molded support beams also possess sufficient dimensional stability, so as to provide a minimum of deformation between loaded and unloaded states.

SUMMARY OF THE INVENTION

In accordance with the present invention, there is provided a molded support beam comprising:

(a) an elongated lower portion having a first vertical side, a second vertical side and a longitudinal axis, and comprising,
  at least three supports, each support being separate and spaced from each other support, each support extending downwardly from said lower portion, each support having and being a neighboring support, each support and its neighboring support forming a pair of neighboring supports, each pair of neighboring supports together defining a transverse opening, said elongated lower portion having at least two transverse openings, each transverse opening having an open bottom,
  wherein at least one pair of neighboring supports comprises a first support and a second support, said first support having an arcuate surface, said second support having an arcuate surface, said arcuate surface of said first support facing said arcuate surface of said second support and together defining an arched transverse opening, said transverse openings comprising at least one arched transverse opening;

(b) an elongated upper portion having a first vertical side, a second vertical side, an upper surface, a longitudinal axis and a length, and comprising,
  a longitudinal passage having a longitudinal axis and extending substantially the length of said elongated upper portion, the longitudinal axis of said longitudinal passage and the longitudinal axis of said elongated upper portion being substantially parallel, and
  a ledge extending substantially horizontally outward from said second vertical side of said elongated upper portion, said ledge having an upper surface;

(c) an elongated support tube residing within said longitudinal passage of said elongated upper portion, said elongated support tube having an elongated hollow interior; and (d) at least one elongated flange extending upwardly from said elongated upper surface of said elongated upper portion, each elongated flange being substantially parallel with the longitudinal axis of said elongated upper portion, wherein said elongated lower portion, said elongated upper portion and each elongated flange are substantially continuous (and together forming a substantially unitary molded article or structure), and the longitudinal axis of said elongated lower portion and the longitudinal axis of said elongated upper portion are substantially parallel. The molded support beam may be described as (aside from the tubular support) a substantially unitary molded support beam (i.e., the elongated lower portion, the elongated upper portion and each elongated flange are substantially continuous and together form a substantially unitary molded article or structure).

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

As used herein and in the claims, terms of orientation and position, such as "upper", "lower", "inner", "outer", "right", "left", "vertical", "horizontal", "top", "bottom" and similar terms, are used to describe the invention as oriented in the drawings. Unless otherwise indicated, the use of such terms is not intended to represent a limitation upon the scope of the invention, in that the invention may adopt alternative positions and orientations.

Unless otherwise indicated, all numbers or expressions, such as those expressing structural dimensions, quantities of ingredients, etc., as used in the specification and claims are understood as modified in all instances by the term "about".

BRIEF DESCRIPTION OF THE DRAWINGS

In FIGS. 1 through 13, like reference numerals designate the same components and structural features, unless otherwise indicated.

DETAILED DESCRIPTION OF THE INVENTION

Figure 1:
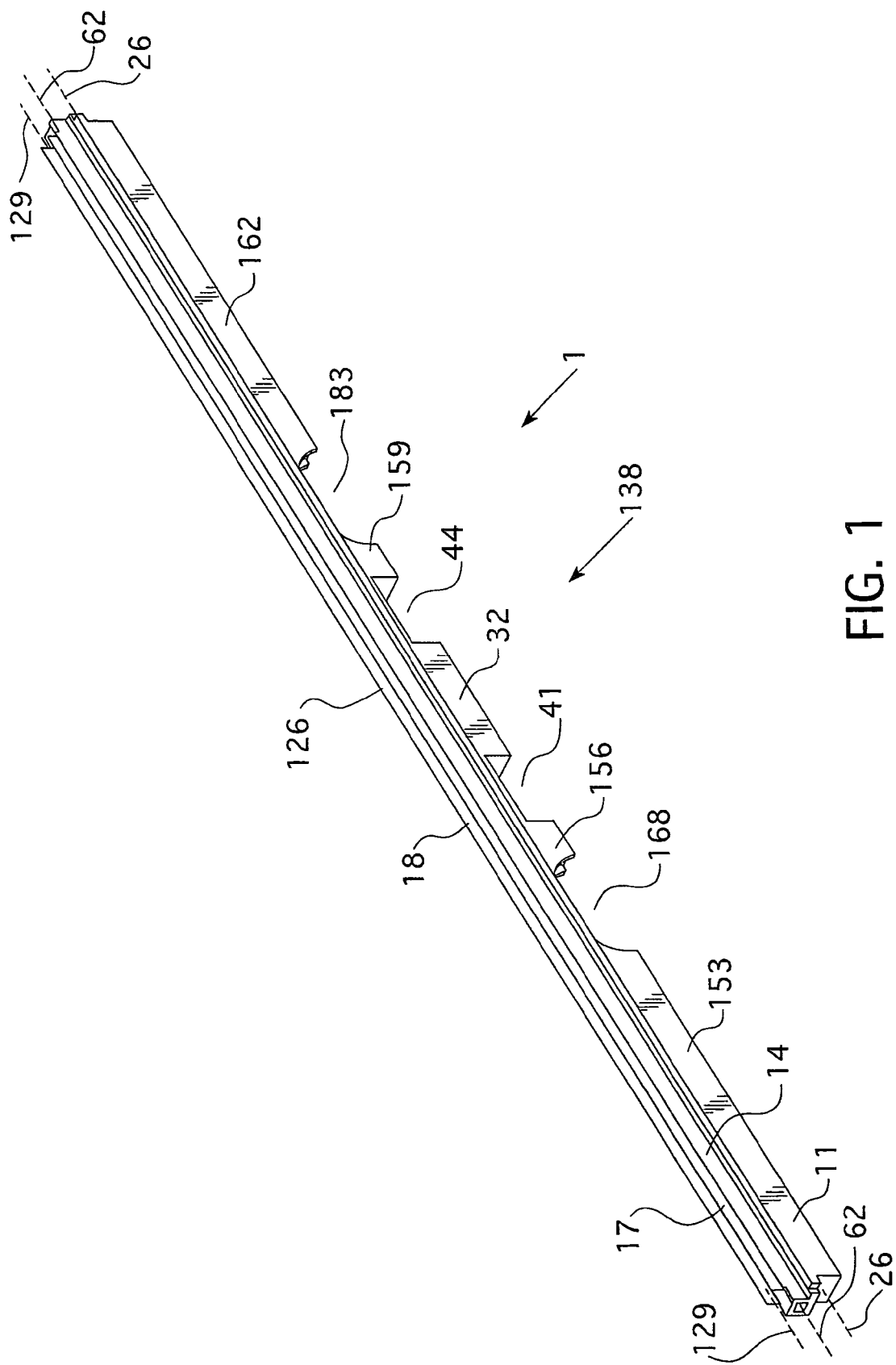
FIG. 1 is a representative perspective view of a molded support beam according to the present invention that includes two elongated flanges, and in which the elongated lower portion includes five supports and four transverse openings.
Figure 2:
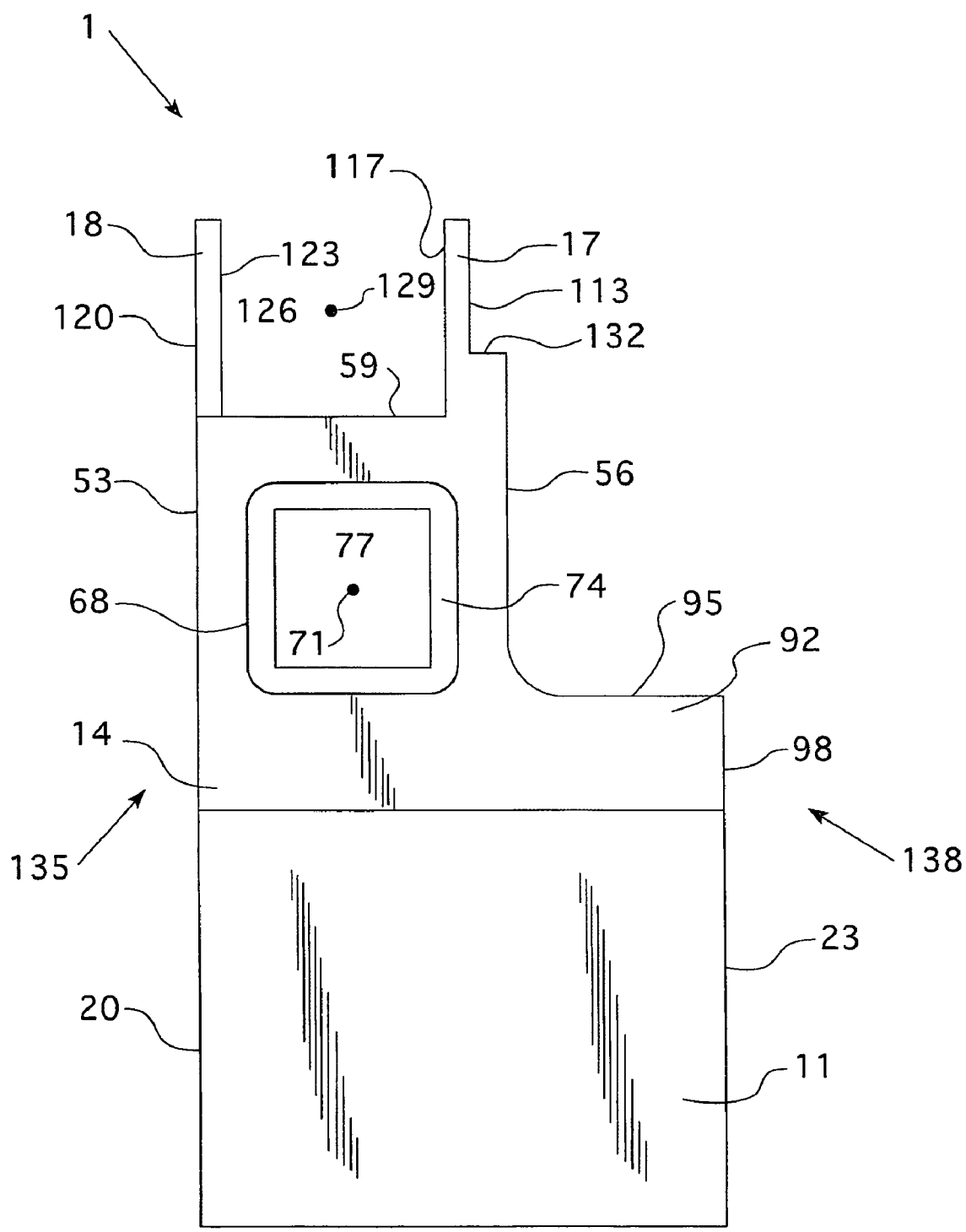
FIG. 2 is a representative end-on view of the left end of the molded support beam of FIG. 1.

With reference to FIGS. 1 and 2 of the drawings, there is depicted a molded support beam 1 according to the present invention that includes, an elongated lower portion 11, and elongated upper portion 14 and at least one elongated flange 17 extending upwardly from upper portion 14.

Figure 11:
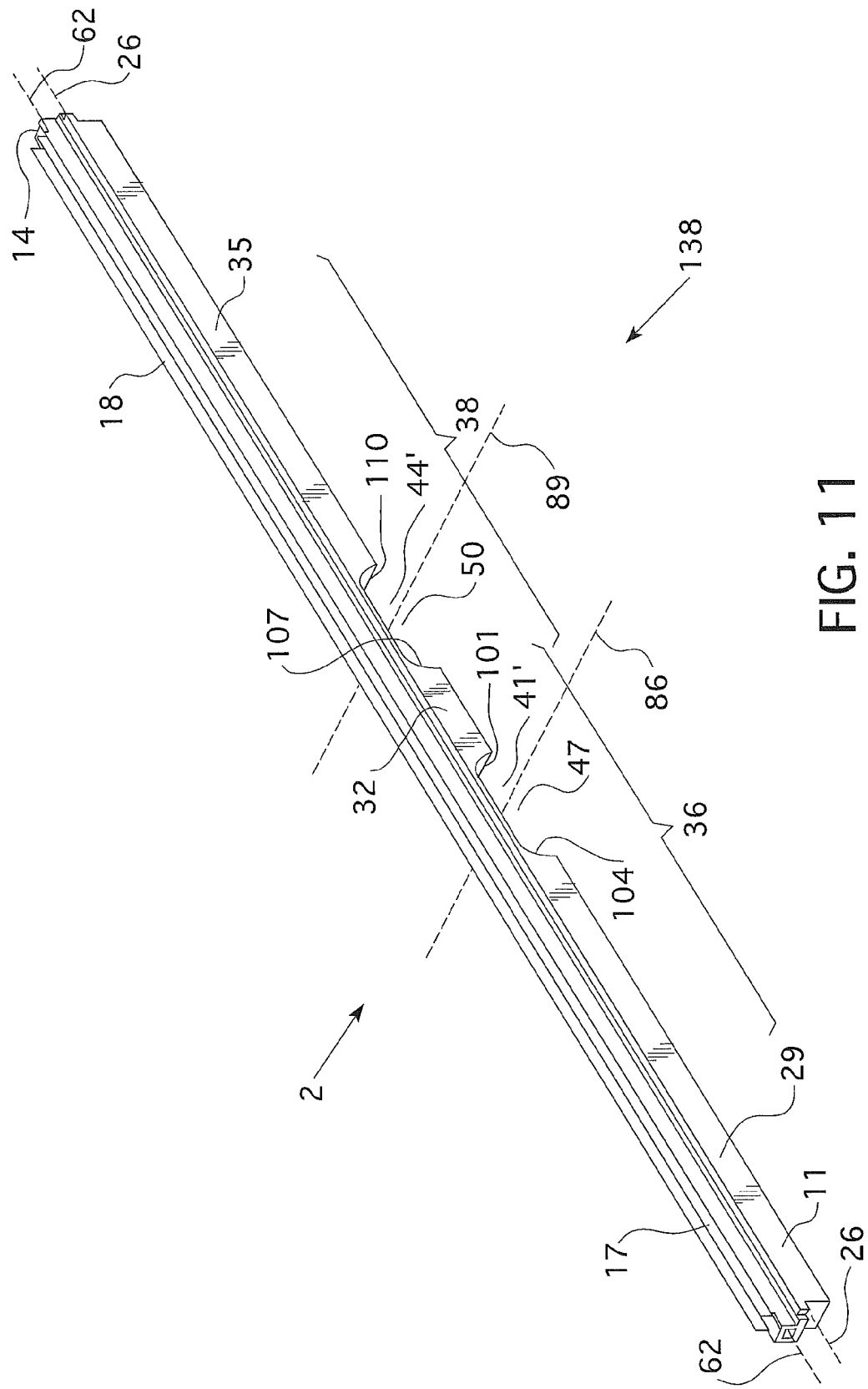
FIG. 11 is a representative perspective view of a molded support beam according to the present invention that includes two elongated flanges, and in which the elongated lower portion includes three supports and two transverse openings.

Elongated lower portion 11 has a first vertical side 20, a second vertical side 23, and a longitudinal axis 26. The elongated lower portion of the molded support beam includes at least three supports, which each extend downwardly from the elongated lower portion. With reference to FIG. 11, elongated lower portion 11 of molded support beam 3, includes three separate supports, 29, 32 and 35, which are separate and spaced apart from each other. Each support of the elongated lower portion has, and is itself, a neighboring support, such that each support and its neighboring support together form a pair of neighboring supports. With further reference to FIG. 11, support 29 is a neighboring support of support 32, and at the same time support 32 is a neighboring support of support 29. Support 29 and support 32 together form a pair of neighboring supports 36. Likewise, support 35 is a neighboring support of support 32, and at the same time support 32 is a neighboring support of support 35, and accordingly supports 32 and 35 together form a pair of neighboring supports 38.

Each pair of neighboring supports of the elongated lower portion of the molded beam of the present invention together define a transverse opening, and, correspondingly, the elongated lower portion includes at least two transverse openings. With reference to FIG. 11, pair 36 of neighboring supports 29 and 32 together define transverse opening 41', and pair 38 of neighboring supports 32 and 35 together define transverse opening 44'. Transverse opening 41' has an open bottom 47, and transverse opening 44' has an open bottom 50.

The transverse openings may each independently have any suitable orientation relative to the longitudinal axis of the elongated lower portion of the molded beam of the present invention. For example, each transverse opening may be independently oriented such that the transverse axis thereof forms an angle of from greater than 0° to less than 180° relative to the longitudinal axis of the elongated lower portion. In an embodiment of the present invention, each transverse opening is oriented so as to be substantially orthogonal relative to (i.e., forming a substantially 90° angle with) the longitudinal axis of the elongated lower portion. More particularly, and with reference to FIG. 11, transverse opening 41' is oriented such that the transverse axis 86 thereof, and transverse opening 44' is oriented such that the transverse axis 89 thereof, are each substantially orthogonal relative to longitudinal axis 26 of elongated lower portion 11.

In an embodiment of the present invention, at least two of the transverse openings of the elongated lower portion are dimensioned to receive a lifting device there-through. With reference to FIGS. 1 and 11, for example, transverse openings 41, 44, 41' and 44' are each dimensioned to receive a lifting device there-through. The lifting device (not shown) may be, for example, the fork or forks of a fork-lift and/or one or more belts or lifting straps. In addition to being dimensioned to receive a lifting device there-through, the surfaces of the neighboring supports that define the lifting-device-dimensioned transverse openings are, in an embodiment, continuous or closed surfaces. The continuous or closed surfaces of the neighboring supports serve to guide the lifting device through the transverse openings, and minimize the risk of the lifting device (e.g., a lifting strap) becoming entangled or jammed in the facing sides of the neighboring supports. In the case of a non-continuous or open surface, for example, defined by ribs, the lifting device could become caught or jammed in the non-continuous surface. Support 32 has a first continuous surface 101, and support 29 has a continuous surface 104 (not visible in FIG. 11). First continuous surface 101 of support 32 and continuous surface 104 of support 29 face each other and together define transverse opening 41', which is dimensioned to receive a lifting device there-through. Support 32 has a second continuous surface 107 (not visible in FIG. 11), and support 35 has a continuous surface 110. Second continuous surface 107 of support 32 and continuous surface 110 of support 35 together define transverse opening 44', which is dimensioned to receive a lifting device there-through.

In an embodiment of the present invention, the transverse openings that are dimensioned to receive a lifting device there-through, may have a polygonal shape (e.g., triangular, rectangular, square, pentagonal, hexagonal, heptagonal, and/or octagonal, etc.), arched or arcuate shapes, irregular shapes, or combinations thereof. With reference to FIG. 11, transverse openings 41' and 44', which are each dimensioned to receive a lifting device there-through, each have arcuate (or arched) shapes. As depicted, for example, in FIG. 1, transverse openings 41 and 44, which are each dimensioned to receive a lifting device there-through, each have substantially rectangular shapes. Rectangular shaped transverse openings that are dimensioned for receipt of a lifting device there-through typically have a width of from 30 cm to 45 cm, more typically from 32 cm to 40 cm, and further typically from 34 cm to 38 cm. Rectangular shaped transverse openings that are dimensioned for receipt of a lifting device there-through typically have a height of from 8 cm to 18 cm, more typically from 10 cm to 16 cm, and further typically from 11 cm to 14 cm. In an embodiment of the present invention, each rectangular shaped transverse opening that is dimensioned for receipt of a lifting device there-through has a width of 35 cm, and a height of 12 cm.

Figure 3:
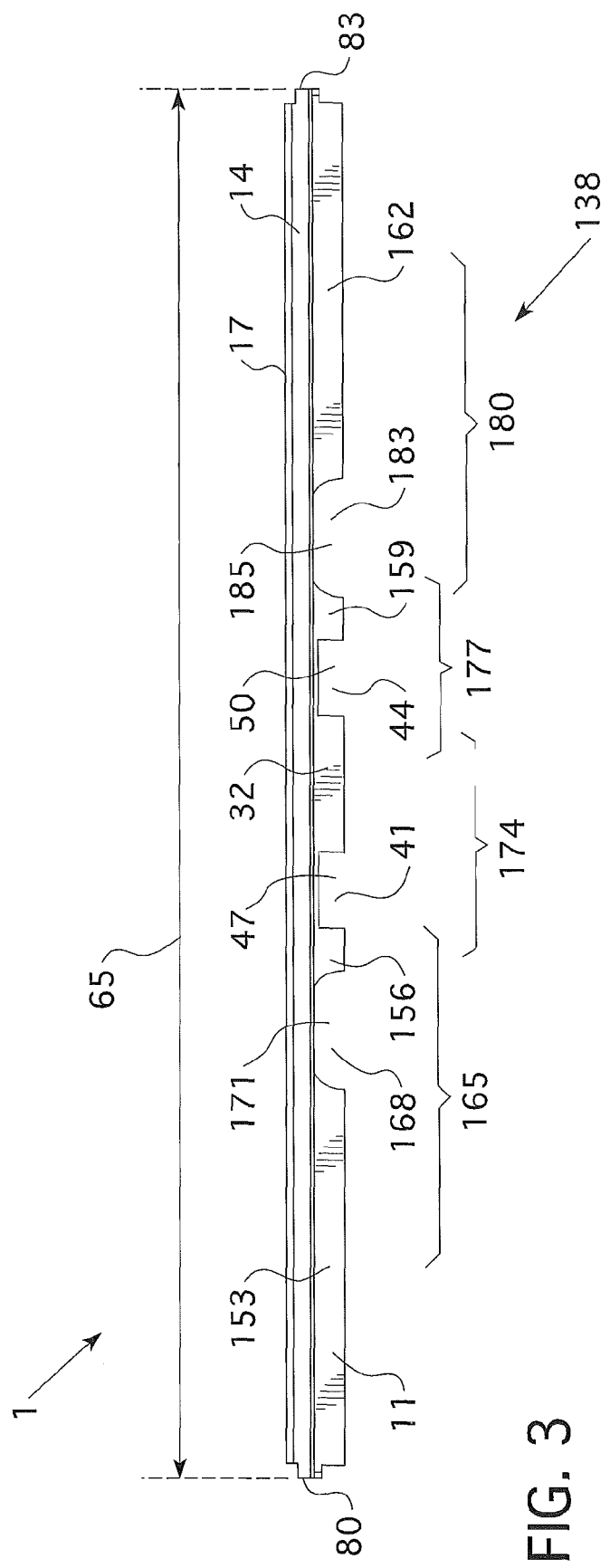
FIG. 3 is a representative elevational view of the forward side of the molded support beam of FIG. 1.
Figure 4:
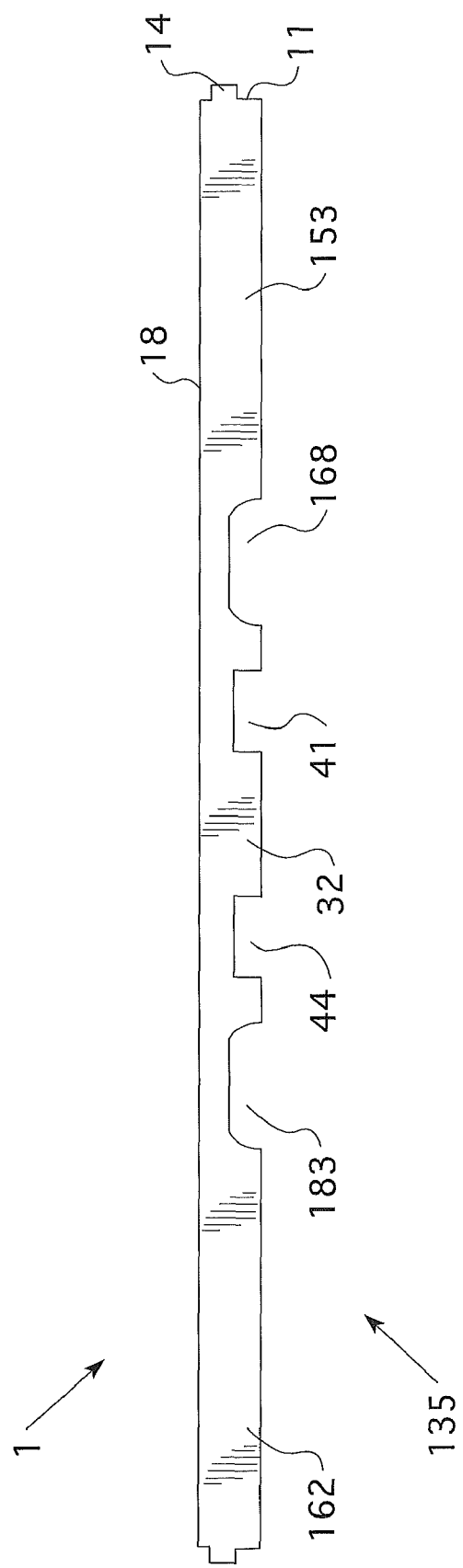
FIG. 4 is a representative elevational view of the rear side of the molded support beam of FIG. 1.

Elongated upper portion 14 of the molded support beam (e.g., beam 1) has a first vertical side 53, a second vertical side 56, an upper surface 59, a longitudinal axis 62, a first end 80 and a second end 83, and a length 65 extending from first end 80 to second end 83 (see FIG. 3). Elongated upper portion 14 further includes a longitudinal passage 68 having a longitudinal axis 71. Longitudinal passage 68 extends substantially the entire length 65 of elongated upper portion 14. Longitudinal axis 71 (FIG. 2) of longitudinal passage 68, and longitudinal axis 62 of elongated upper portion 14 are substantially parallel. In an embodiment of the present invention, longitudinal axis 71 of longitudinal passage 68, and longitudinal axis 62 of elongated upper portion 14 are substantially aligned (i.e., overlapping).

The molded support beam (e.g., beam 1) further includes an elongated hollow support tube 74 that resides within longitudinal passage 68 of upper portion 14. Elongated support tube 74 has an elongated hollow interior 77. Elongated hollow interior 77 may extend less than the total length of elongated support tube 74 (not shown). More typically, elongated hollow interior 77 extends the entire length of elongated support tube 74 (as depicted in the drawings). Elongated support tube 74, and accordingly the elongated hollow interior 77 thereof, may be closed or capped (not shown). In an embodiment of the present invention, elongated support tube 74, and accordingly the elongated hollow interior 77 thereof, has open ends, as depicted in the drawing figures.

Elongated support tube 74 may extend less than (not shown), equivalently to, or more than (not shown) length 65 of elongated upper portion 14. Elongated support tube 74 may extend beyond one or both of first end 80 and second end 83 of elongated upper portion 14 for purposes including, but not limited to, connecting elongated support tube 74 (and, correspondingly, the molded support beam) to separate structural elements, such as transverse support beams and/or vertical support posts (not shown). In an embodiment of the present invention, elongated support tube 74 has a length that is substantially equivalent to length 65 of elongated upper portion 14, and does not extend beyond first end 80 or second end 83 of elongated upper portion 14.

Elongated upper portion 14 further includes a ledge 92 that extends substantially horizontally outward from second vertical side 56 thereof. Ledge 92 has an upper surface 95. Upper surface 95 of ledge 92 may serve as a load bearing surface for a separate element, such as a floor element(s) (not shown), of a structure, such as a shipping container (not shown), in which the molded beam is incorporated as, for example, a lower molded support beam. Ledge 92 includes a vertical surface 98 that extends downwardly relative to upper surface 95. Vertical surface 98 of ledge 92 is positioned outward relative to second vertical side 56 of elongated upper portion 14.

Ledge 92, or a portion thereof, may extend out less than, no further than, or beyond the second vertical side of elongated lower portion 11. More particularly, vertical surface 98 of ledge 92 or a portion thereof, may be positioned: inward or back from second vertical side 23 of elongated lower portion 11; substantially flush with second vertical side 23; or beyond or further outward relative to second side surface 23. Correspondingly, ledge 92 may be: cantilevered out beyond; partially supported by; or substantially fully supported by elongated lower portion 11.

As depicted in the drawing figures (e.g., FIG. 2), ledge 92 extends out no further than elongated lower portion 11, and accordingly, vertical surface 98 of ledge 92 is substantially flush with second vertical side (or surface) 23 of elongated lower portion 11. Correspondingly, ledge 92 is supported, and, in particular, substantially fully supported, by elongated lower portion 11, as depicted in the drawing figures.

Ledge 92 may be a substantially continuous ledge, as depicted in the drawing figures. Alternatively, ledge 92 may comprise a plurality of separate ledges (not shown), each extending outward from second vertical side 56 of elongated upper portion 14, and each having an upper surface (e.g., a load bearing surface). In an embodiment of the present invention, ledge 92 is a substantially continuous ledge, and extends substantially the length 65 of elongated upper portion 14.

The molded support beam of the present invention also includes at least one flange (e.g., flange 17) extending upwardly from upper surface 59 of elongated upper portion 14. Each elongated flange (e.g., flange 17) is oriented substantially parallel with longitudinal axis 62 of elongated upper portion 14. The molded support may include one, or two or more elongated upper flanges (e.g., three, four or more flanges). Typically, the molded support beam comprises one or two elongated flanges, such as flange 17 and flange 18 of molded support beams 1 and 2. Each elongated flange may be continuous or non-continuous (i.e., comprising a plurality of separate upwardly extending flanges that together define an elongated flange). Typically, each elongated flange is substantially continuous throughout its length. Each elongated flange may extend over the entire length 65 of elongated upper portion 14, or a portion thereof. As depicted in the drawings, elongated flanges 17 and 18 each extend along a substantial portion of (but less than the full) length 65 of elongated upper portion 14.

Each elongated flange has an external vertical surface and an interior vertical surface. When two or more elongated flanges are present, the facing interior surfaces of neighboring elongated flanges and the upper surface of the elongated upper portion there-between together define an elongated upper channel. With reference to FIG. 2, flange 17 has an exterior vertical surface 113 and an interior vertical surface 117, and flange 18 has an exterior vertical surface 120 and an interior vertical surface 123. Interior vertical surface 123 of flange 18 and interior vertical surface 117 of flange 17 face each other, and together with upper surface 59 of elongated upper portion 14 define elongated channel 126, which has a longitudinal axis 129. Longitudinal axis 129 of elongated channel 126 is substantially parallel with longitudinal axis 62 of elongated upper portion 14.

The elongated flange or flanges provide a means by which the molded support beam may provide support for separate structural elements, such as wall components (not shown). The base surface of a wall component (not shown) may rest abuttingly on upper surface 59 of elongated upper portion 14, and be attached to an elongated flange by means of adhesives and/or fasteners (not shown) passing through the flange and at least partially through the wall component. In the case of two or more elongated flanges, the elongated channel(s) defined thereby (e.g., elongated channel 126) may supportingly receive a separate structural component, such as a wall component, therein. The separate structural component, such as a wall component, may: merely rest abuttingly within elongated channel 126; or alternatively or in addition thereto, it may be fixedly held therein by means of adhesives and/or fasteners passing through one or more flanges, and at least partially through the separate structural component.

In an embodiment of the present invention, one elongated flange comprises a ledge that extends substantially horizontally outward from the exterior vertical surface of the elongated flange and towards (in the direction of) the second vertical side of the elongated upper portion. With reference to FIG. 2, elongated flange 17 has a ledge 132. Ledge 132 extends substantially horizontally outward from exterior vertical surface 113 of flange 17 in the direction of (or towards) vertical side 56 of elongated upper portion 14. Ledge 132 provides a further means by which molded support beam 1 may provide support for a separate structural component, such as a wall component (not shown). For example, a wall component may have an elongated slot in a lower surface thereof that is sized to receive a portion of elongated flange 17 therein, while having separate lower surfaces that concurrently abut upper surface 59 of elongated upper portion 14 and ledge 132 of elongated flange 17. Alternatively, ledge 132 may provide support for a separate structural component, such as a floor component (not shown), that includes an elongated notch so as to rest abuttingly on load bearing upper surface 95 of ledge 92 of elongated upper portion 14, and concurrently on ledge 132 of elongated flange 17.

Elongated lower portion 11, elongated upper portion 14 and each elongated flange (e.g., elongated flanges 17 and 18) are substantially continuous, and together form a substantially unitary molded article or structure. Accordingly, the molded support beam of the present invention (aside from the elongated support tube) is a substantially unitary molded support beam. Longitudinal axis 26 of elongated lower portion 11 and longitudinal axis 62 of elongated upper portion 14 are substantially parallel, one with the other. The elongated lower portion, elongated upper portion and each elongated flange together being in the form of a substantially unitary molded article or structure provides for improved structural and dimensional stability and integrity (relative to non-unitary structures), such that the molded support beam of the present invention provides a minimum of deformation (e.g., vertical and/or torsional deflection) between loaded and unloaded states.

The molded beam of the present invention has a first elongated side 135 and a second elongated side 138. First elongated side 135 is defined by first vertical side 20 of elongated lower portion 11, first vertical side 53 of elongated upper portion 14, and optionally exterior vertical surface 120 of elongated flange 18. Second elongated side 138 is on the same side of the molded support beam as ledge 92 of elongated upper portion 14. Accordingly, second elongated side 138 is defined by second vertical side 23 of elongated lower portion 11, ledge 92 (including upper horizontal surface 95 and vertical surface 98 thereof, second vertical side 56 of elongated upper portion 14, and optionally exterior vertical surface 113 of elongated flange 17 (further optionally including ledge 132 thereof).

The supports of the lower portion of the molded support beam may be solid or hollow. In the case of a hollow support, the interior surfaces of the external walls of the support together define the hollow interior thereof. When hollow, the support typically has an open lower portion or bottom that is downward facing. Hollow supports provide the molded support beam of the present invention with reduced weight while concurrently maintaining dimensional stability of the beam.

Figure 5:
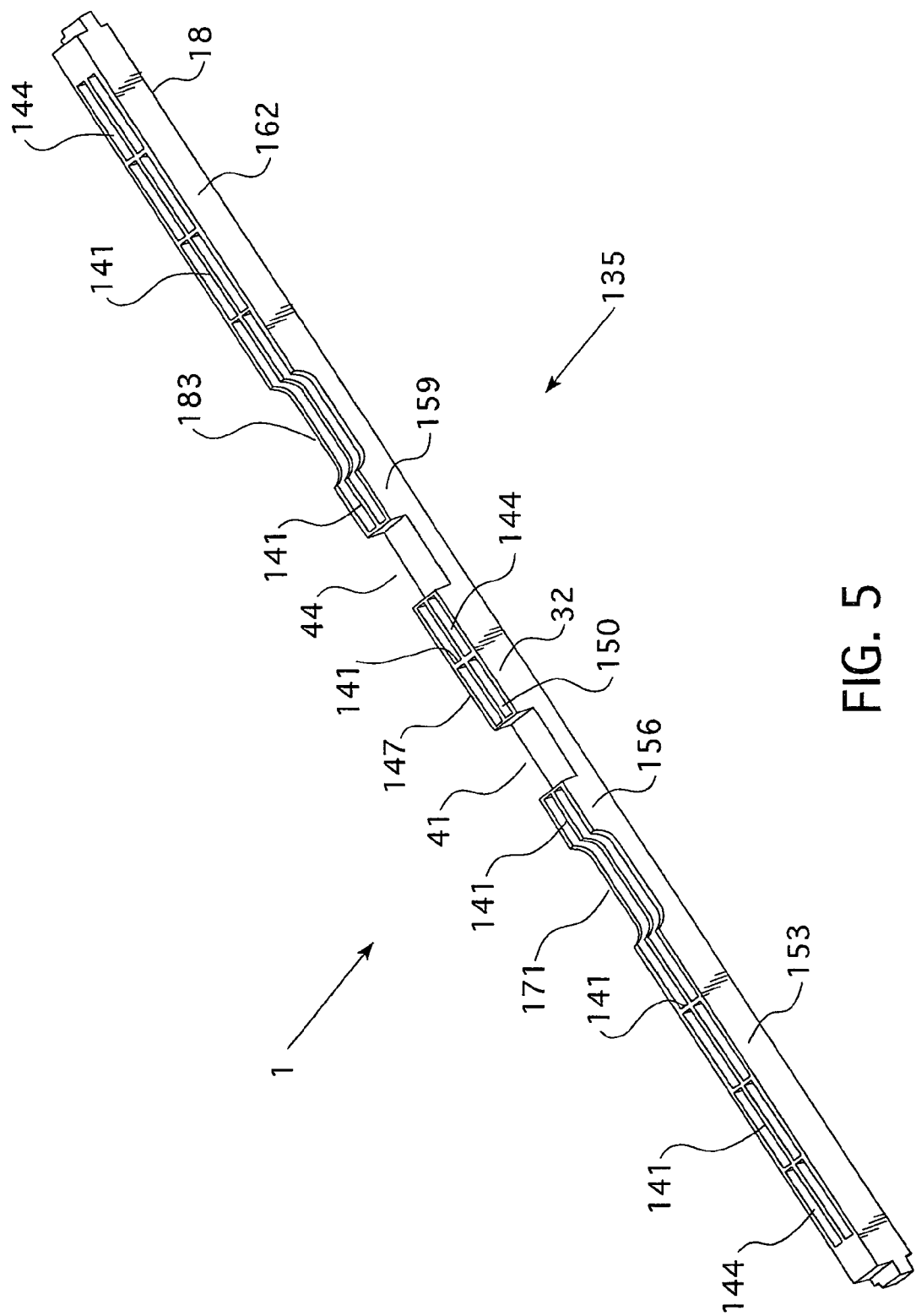
FIG. 5 is a representative perspective view of the underside of the molded support beam of FIG. 1.

In an embodiment of the present invention, at least one support of the elongated lower portion comprises a plurality of internal ribs that together define internal hollow portions. The plurality of internal ribs are integral (i.e., continuous) with the support. With reference to FIG. 5, molded support beam 1 has five separate supports, each of which includes a plurality of internal ribs. In particular, support 32 includes a plurality of internal ribs 141 that together define hollow portions 144. Internal ribs 141 are integral with the external sidewalls 147 of support 32. The internal ribs of the supports are typically formed concurrently with mold formation of the molded support beam in accordance with art-recognized methods, e.g., by compression molding, injection molding or reaction injection molding as will be discussed in further detail herein. The presence of internal ribs in the supports provide the molded beam of the present invention with a desirable combination of reduced weight (relative to solid supports) and dimensional stability.

In an embodiment of the present invention, the internal hollow portions (e.g., 144) of the support(s), that are defined by internal ribs 141, have open lower portions (or open bottoms) 150 that are downwardly facing. The open bottoms of the supports provide a further means of achieving weight reduction (relative to closed or capped bottoms). Typically, so as to avoid mold-lock, the open lower portions (e.g., 150) of the supports result from the molding method by which the beam is fabricated. During molding of the beam, mold cores or extensions extend outward from an internal mold surface or wall, and serve to form the internal ribs and the hollow portions defined thereby, as is known to the skilled artisan.

In an embodiment of the present invention, the elongated lower portion of the molded support beam includes five supports and four transverse openings defined thereby. With reference to FIGS. 1 and 3, molded support beam 1 includes five separate supports (from left to right in FIGS. 1, 3 and 5): 153; 156; 32; 159; and 162. Support 153 is a first terminal or outer support and is positioned proximately to first end 80 of molded support beam 1 (FIG. 3). Support 162 is a second terminal or outer support and is positioned proximately to second end 83 of molded support beam 1. Support 32 is substantially centrally positioned, and support 156 is interposed between support 153 and support 32, while support 159 is interposed between support 32 and support 162.

Support 153 and support 156 together form a pair of neighboring supports 165 that together define transverse opening 168 (which is an arched transverse opening) there-between, having an open bottom 171. Support 156 and support 32 together form a pair of neighboring supports 174 that together define transverse opening 41 there-between, having an open bottom 47. Support 32 and support 159 form a pair of neighboring supports 177 that together define transverse opening 44 there-between, having an open bottom 50. Support 159 and support 162 form a pair of neighboring supports 180 that together define transverse opening 183 (which is an arched transverse opening), having an open bottom 185. As such, the four transverse openings of molded beam 1 are (from left to right in FIGS. 1, 3 and 5) transverse openings: 168; 41; 44; and 183.

The supports and transverse openings may be symmetrically or asymmetrically positioned along the elongated lower portion of the molded support beam. Alternatively, or, in addition to positioning, the supports and transverse openings may be symmetrically or asymmetrically dimensioned. Typically, the supports and transverse openings are symmetrically positioned and symmetrically dimensioned along the elongated lower portion. For example, supports 153 and 162 of molded beam 1 each have substantially the same dimensions and are substantially symmetrically positioned at opposite ends of the elongated lower portion. Supports 156 and 159 of molded support beam 1 have substantially equivalent dimensions and are positioned substantially symmetrically on either side of centrally located support 32. Transverse openings 168 and 183 have substantially equivalent dimensions, and are substantially symmetrically positioned further outward along elongated lower portion 11 relative to transverse openings 41 and 44. Transverse openings 41 and 44 have substantially equivalent dimensions and are each positioned substantially symmetrically relative to centrally located support 32.

Depending on whether the elongated lower portion has an even number or odd number of supports, symmetrical positioning of the supports (along the elongated lower portion) typically results in the elongated lower portion of the molded beam having a substantially centrally located support or a substantially centrally located transverse opening. Typically, when the elongated lower portion has an odd number of symmetrically positioned supports, one of the supports is a substantially centrally located support. In addition, when the elongated lower portion has an even number of symmetrically positioned supports, one of the transverse openings thereof is a substantially centrally located transverse opening.

For example, molded beams 1 and 2 of FIGS. 1 and 11 each have an odd number of symmetrically positioned supports, one of which is a substantially centrally located support. Molded beam 1 (FIGS. 1 and 3) has five substantially symmetrically positioned supports 153, 156, 32, 159 and 162, with support 32 thereof being substantially centrally positioned or located. Molded beam 2 (FIG. 11) has three substantially symmetrically positioned supports 29, 32 and 35, with support 32 thereof being substantially centrally positioned or located. Molded beam 3 (e.g., FIG. 8) has eight substantially symmetrically positioned supports, and correspondingly seven substantially symmetrically positioned transverse openings, one of which is a substantially centrally located transverse opening. For purposes of further illustration, and as will be discussed in further detail herein, molded beam 3, of FIGS. 6 and 8, has eight substantially symmetrically positioned supports 188, 201, 156, 204, 207, 159, 210, and 213, and correspondingly seven substantially symmetrically positioned transverse openings, 219, 168, 41, 234, 44, 183 and 249, with transverse opening 234 thereof being a substantially centrally positioned transverse opening 234.

Figure 6:
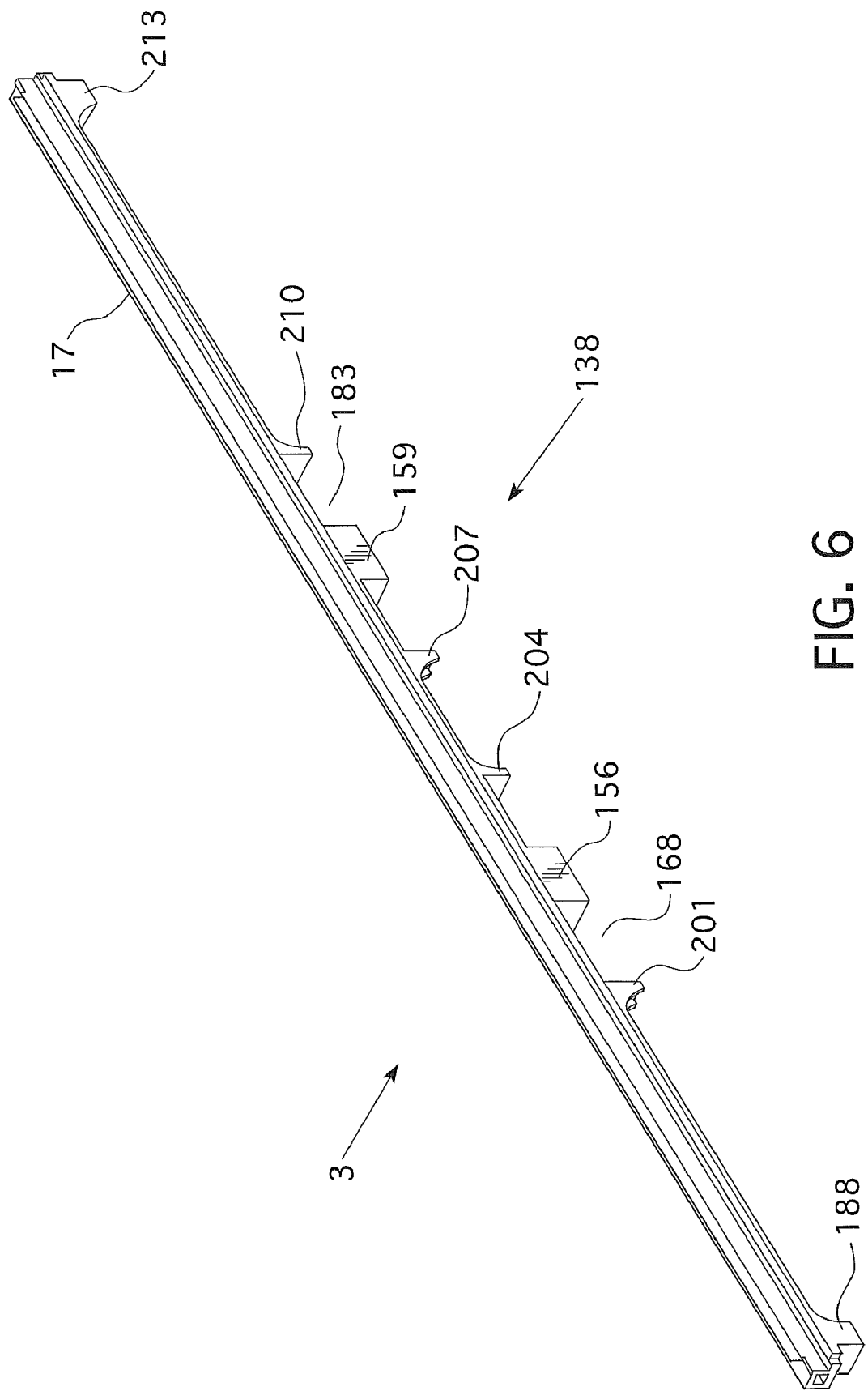
FIG. 6 is a representative perspective view of another molded support beam according to the present invention that includes a single elongated flange, and in which the elongated lower portion includes eight supports and seven transverse openings.
Figure 7:
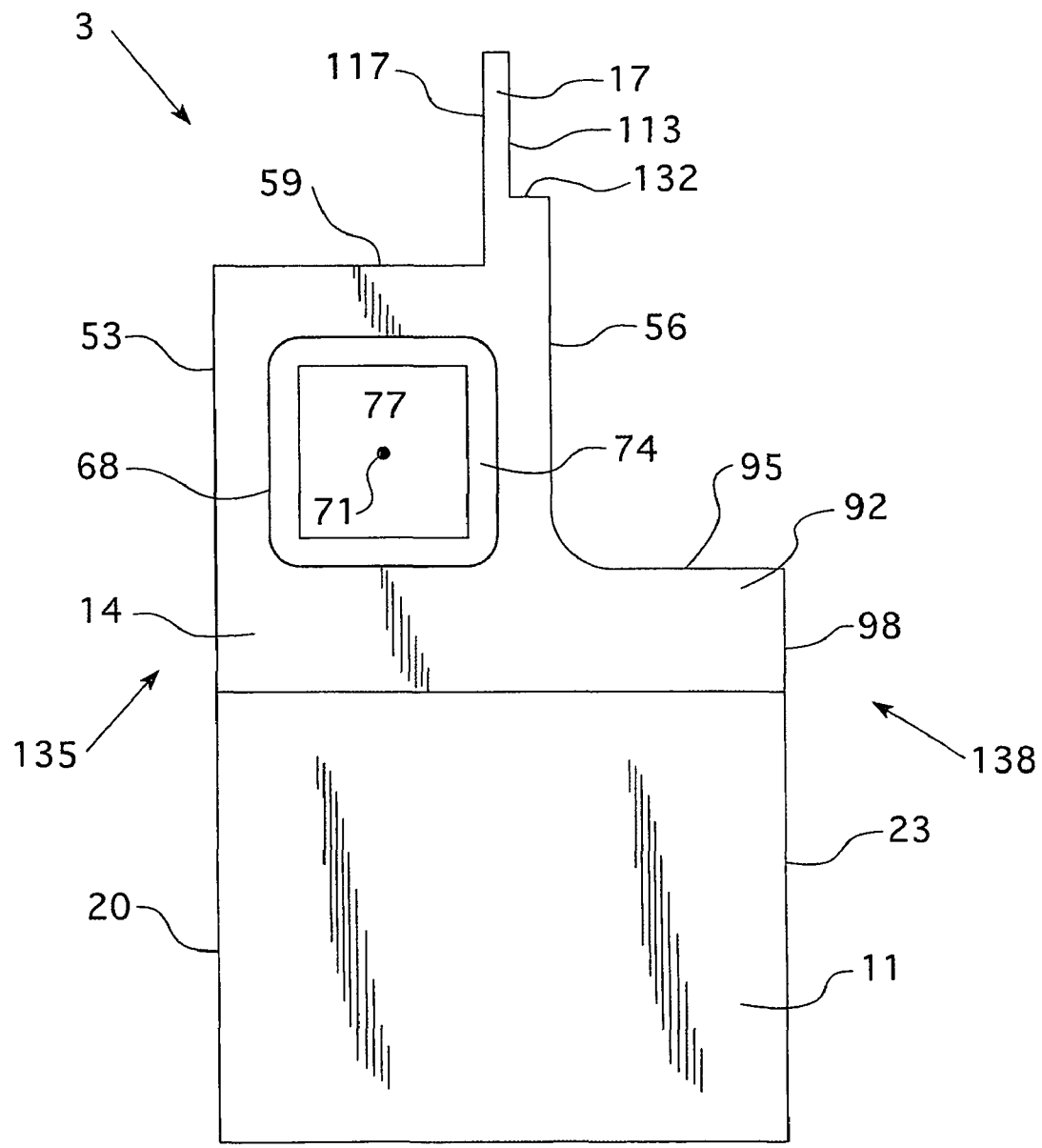
FIG. 7 is a representative end-on view of the left end of the molded support beam of FIG. 6.
Figure 8:
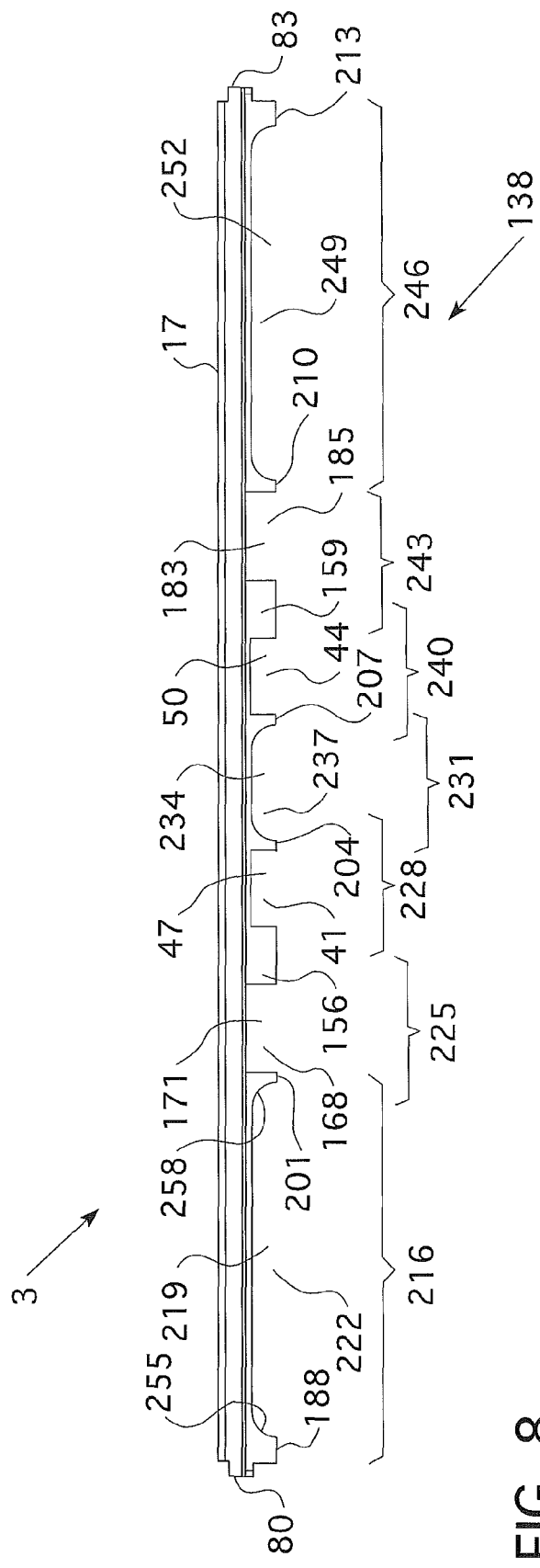
FIG. 8 is a representative elevational view of the forward side of the molded support beam of FIG. 6.

In a further embodiment of the present invention, the elongated lower portion of the molded support beam has eight supports and seven transverse openings. With reference to FIG. 6 and 8, molded support beam 3 includes eight separate supports (from left to right in FIGS. 6 and 8): 188; 201; 156; 204; 207; 159; 210; and 213. Support 188 is a first terminal or outer support and is positioned proximately to first end 80 of molded support beam 3 (FIG. 8), and support 213 is a second terminal or outer support and is positioned proximately to second end 83 of molded support beam 3. Support 201 is interposed between support 188 and support 156. Support 156 is interposed between support 201 and support 204. Support 204 is interposed between support 156 and support 207. Support 207 is interposed between support 204 and support 159. Support 159 is interposed between support 207 and support 210. Support 210 is interposed between support 159 and support 213. Since supports 188 and 213 are each terminal supports, they are not interposed between any other two supports.

Support 188 and support 201 together form a pair of neighboring supports 216 that together define transverse opening 219 there-between, having an open bottom 222. Support 201 and support 156 together form a pair of neighboring supports 225 that together define transverse opening 168 there-between, having an open bottom 171. Support 156 and support 204 together form a pair of neighboring supports 228 that together define transverse opening 41 there-between, having open bottom 47. Support 204 and support 207 form a pair of neighboring supports 231 that together define transverse opening 234, having an open bottom 237. Support 207 and support 159 together form a pair of neighboring supports 240 that together define transverse opening 44, having open bottom 50. Support 159 and support 210 together form a pair of neighboring supports 243 that together define transverse opening 183 there-between, having an open bottom 185. Support 210 and support 213 together define a pair of neighboring supports 246 that together define transverse opening 249, having an open bottom 252.

At least one pair of neighboring supports of the elongated lower portion of the molded support beam include a first support and a second support. The first support has an arcuate surface that faces an arcuate surface of the second support. The facing arcuate surfaces of the neighboring pair of supports together defining an arched transverse opening there-between (having an arched or arcuate shape). With further reference to FIGS. 6 and 8, neighboring pair of supports 216 includes first support 188 which has an arcuate surface 255, and second support 201 having an arcuate surface 258. Arcuate surface 255 of first support 188 faces arcuate surface 258 of second support 201, and together define arched transverse opening 219, which has a partial arched shape.

Figure 13:
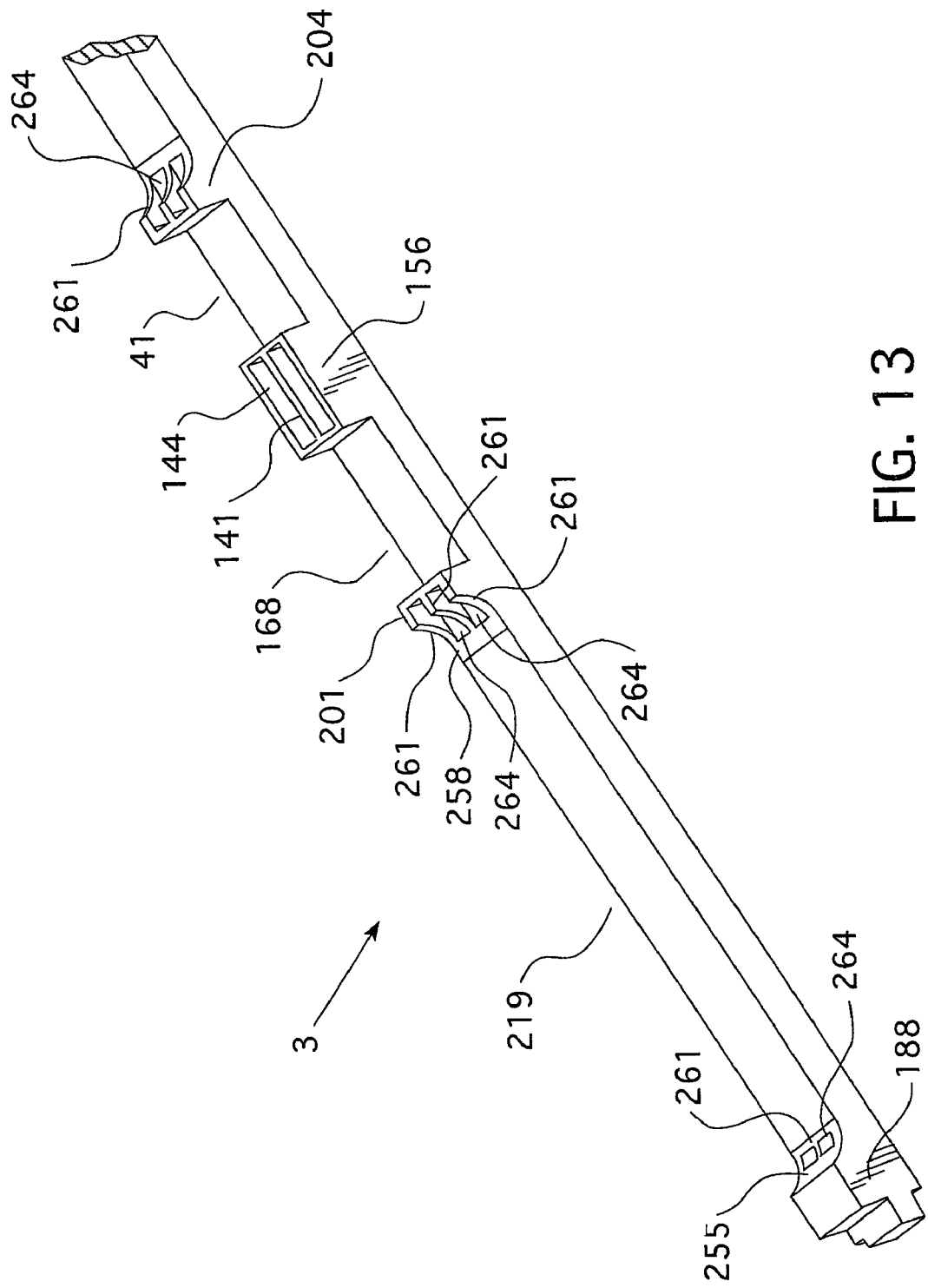
FIG. 13 is a representative magnified perspective view of the underside of a portion of the molded support beam depicted in FIG. 10.

The arcuate surfaces or portions of the supports serve to transfer downward forces imparted on the molded support beam down through the base of the support, and also serve to reduce the weight of the support and the molded beam. The arcuate surfaces of the supports that define the transverse opening there-between may be continuous (or closed) surfaces, or discontinuous (or open) surfaces. For example and with reference to FIGS. 10 and 13, arcuate surface 255 of support 188 and arcuate surface 258 of support 201 are each independently defined in part by internal arcuate ribs 261 (that are integral with the supports in which they reside) and the hollow portions 264 defined thereby. The combination of arcuate or arched supports, and integral internal arcuate support ribs, serves to further reduce the weight of the support, and the molded support beam, without compromising the strength and dimensional stability of the beam.

Neighboring pairs of supports 216, 231 and 246 of molded support beam 3 comprise supports (188 and 201; 204 and 207; and 210 and 213, respectively) each having an arcuate surface that faces the arcuate surface of its neighboring support, and together defining the respective arched transverse openings there-between (219, 234 and 249, respectively). Transverse openings 219, 234 and 249 of molded beam 3 are each accordingly an arched transverse opening, and are depicted as having partial arched shapes.

In an embodiment, the elongated lower portion of the molded support beam includes an even number (e.g., 4, 6, 8, etc.) of supports, which are substantially symmetrically positioned (e.g., relative to each other) along the elongated lower portion. The even number of supports further include: a first terminal pair of neighboring supports having facing (or opposed) arcuate surfaces that together define a first terminal arched transverse opening; a central pair of neighboring supports having facing arcuate surfaces that together define a central arched transverse opening; and a second terminal pair of neighboring supports having facing arcuate surfaces that together define a second terminal arched transverse opening. The central pair of neighboring supports is positionally interposed between the first terminal pair of neighboring supports and the second terminal pair of neighboring supports, and the central arched transverse opening is positionally interposed between the first terminal arched transverse opening and the second terminal arched transverse opening.

Figure 9:
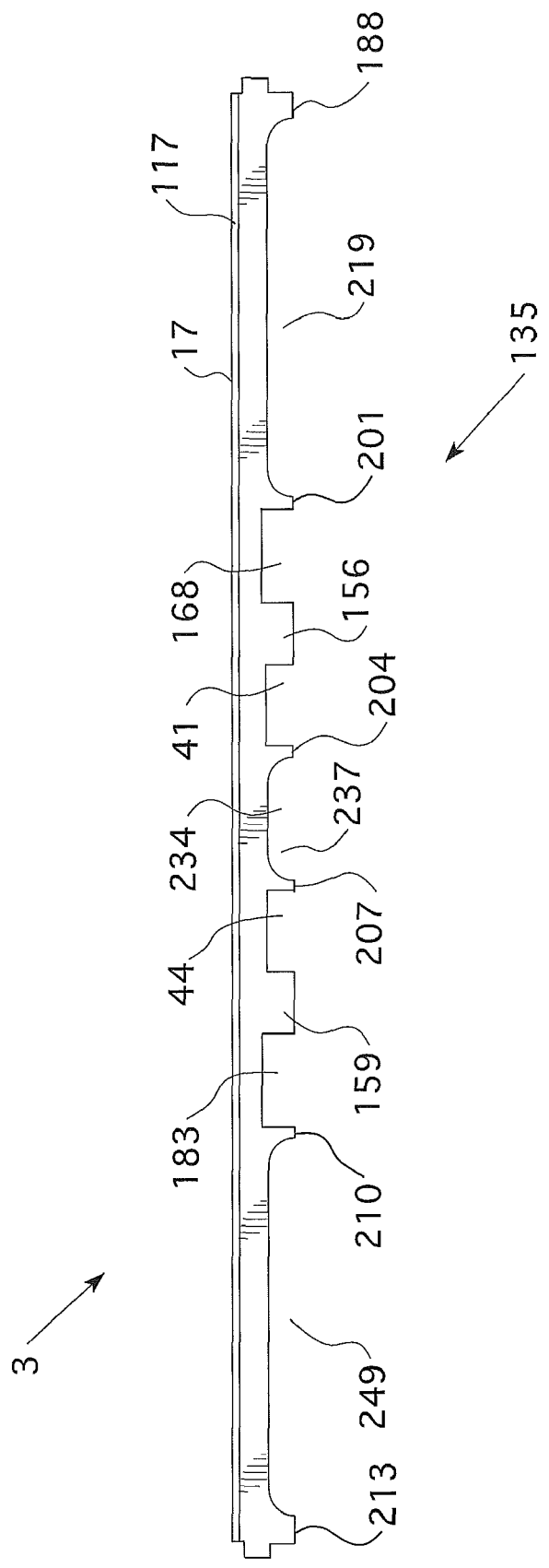
FIG. 9 is a representative elevational view of the rear side of the molded support beam of FIG. 6.
Figure 10:
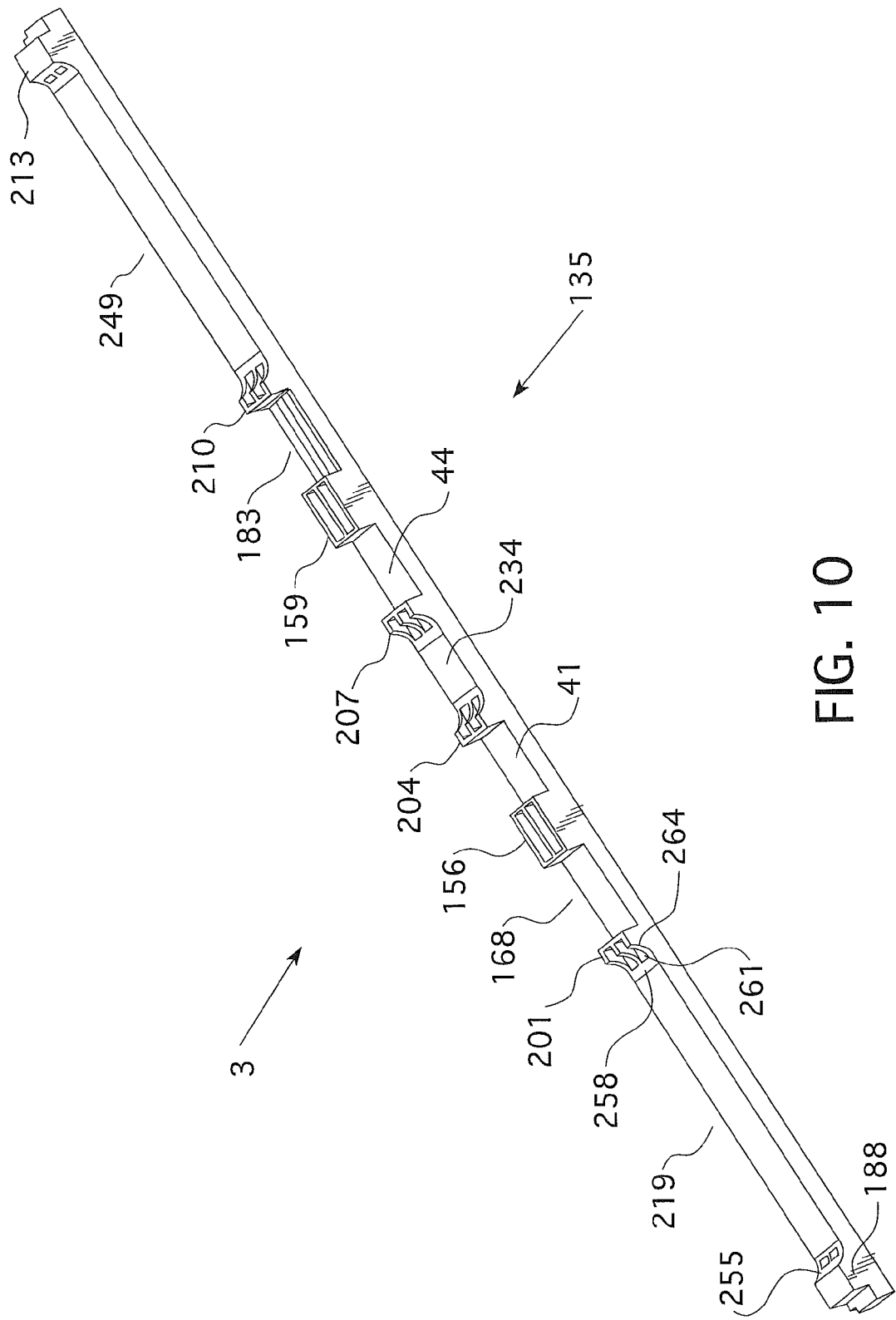
FIG. 10 is a representative perspective view of the underside of the molded support beam of FIG. 6.

Molded beam 3 of FIGS. 8, 9 and 10 may be further described as having an even number (i.e., 8) of supports (i.e., supports 188, 201, 156, 204, 207, 159, 210 and 213), that are substantially symmetrically positioned along elongated lower portion 11 thereof. Molded beam 3 includes: a first terminal pair of neighboring supports 216 (comprising supports 188 and 201), that together define first terminal arched transverse opening 222; a central pair of neighboring supports 231 (comprising supports 204 and 207), that together define central arched transverse opening 234; and a second terminal pair of neighboring supports 246 (comprising supports 210 and 213), that together define second terminal arched transverse opening 249. The central pair of neighboring supports 231 are positionally interposed between the first terminal pair of neighboring supports 216 and the second terminal pair of neighboring supports 246. Correspondingly, central arched transverse opening 234 is positionally interposed between or relative to the first terminal arched transverse opening 222 and the second terminal arched transverse opening 249.

The first and second terminal arched transverse openings are each defined in part by a terminal support. For example, first terminal arched transverse opening 222 is defined in part by first terminal (or outer) support 188, and second terminal arched transverse opening 249 is defined in part by second terminal (or outer) support 213. First terminal arched transverse opening 222 is accordingly proximate to first end 80 of molded support beam 3, and second terminal arched transverse opening 249 is accordingly proximate to second end 83 of molded support beam 3.

Providing the lower portion of the molded beam with such an arrangement of a central pair of neighboring arcuate supports interposed between first and second terminal pairs of neighboring arcuate supports (and the central, first and second arched transverse openings respectively defined thereby) provides the molded beam of the present invention with a combination of weight reduction coupled with enhanced weight/force distribution and dimensional stability. In particular, the forces associated with an article(s) supported by the molded beam are more evenly and efficiently distributed downward through the lower portion of the beam by means of the neighboring arcuate surfaced supports that together define each of the central arched transverse opening positionally interposed between the separate first and second terminal arched transverse openings. Such an even distribution of forces down through the lower portion of the molded beam also reduces torsional deformation of the molded beam by such forces.

The arched transverse opening or openings of the elongated lower portion of the molded beam of the present invention (e.g., arched transverse openings 219, 234 and 249) may have arched shapes selected from complete arched shapes and/or partial arched shapes. Complete arched shapes (not depicted in the drawings) typically form or trace a portion of a circle or oval. Partial arched shapes (as depicted in the drawings) are defined in part by arcuate surfaces (e.g., the facing arcuate surfaces, 255 and 258, of neighboring supports, 188 and 201), and may be further defined by non-arcuate surfaces (e.g., substantially horizontal surfaces).

Elongated support tube 74 resides within longitudinal passage 68 of elongated upper portion 14 of the molded support beam. The elongated support tube may reside loosely or fixedly within the longitudinal passage. Elongated support tube 74 is typically fixedly held within longitudinal passage 68, e.g., by means of adhesives (not shown) and/or fasteners (such as bolts and/or screws—not shown) passing (e.g., transversely) through elongated upper portion 14 and into and/or through support tube 74. The elongated support tube may be placed within the longitudinal passage of the elongated upper portion after mold formation (i.e., molding) of the elongated upper portion. More typically, the elongated support tube is positioned within the longitudinal passage concurrently with mold formation of the elongated upper portion and accordingly the molded beam.

In an embodiment, elongated support tube 74 is fixed (or caused to be fixedly held) within longitudinal passage 68 during mold formation of the elongated upper portion, and correspondingly the molded support beam. For example, and in accordance with art-recognized methods, elongated support tube 74 may be positioned and held within a mold cavity, followed by plastic material being introduced into the molded cavity (e.g., in a molten form), thereby concurrently forming the elongated upper portion of the molded support beam, and fixedly setting the elongated support tube within the concurrently formed longitudinal passage of the elongated upper portion. When fixed in place during mold formation of the elongated upper portion, the elongated support tube typically defines the longitudinal passage of the elongated upper portion in which it is fixedly held.

The longitudinal passage of the elongated upper portion, the elongated support tube, and the elongated hollow interior of the support tube may each independently have a cross-sectional shape selected from circular shapes, oval shapes (e.g., ellipsoidal shapes), polygonal shapes (e.g., triangular, rectangular, square, pentagonal, hexagonal, heptagonal, octagonal, etc.), irregular shapes and combinations thereof. When fixed in place during mold formation of the elongated upper portion of the molded support beam, the support tube, and more particularly the exterior surface of the support tube, and the longitudinal passage of the elongated upper portion each have substantially the same cross-sectional shape (e.g., square, as depicted in the drawings), while the elongated hollow interior of the support tube may have a different cross-sectional shape. If the elongated support tube is placed within the longitudinal passage of the elongated upper portion after mold formation of the molded support beam, the elongated support tube (more particularly the exterior surface of the support tube) and the longitudinal passage may each have different cross-sectional shapes (e.g., a round support beam residing within a square longitudinal passage, or a square support beam residing within a round longitudinal passage). In an embodiment of the present invention, the longitudinal passage of the elongated upper portion, the elongated support tube and the elongated hollow interior of the support tube each independently have a cross-sectional shape selected from rectangular shapes.

The presence of an elongated support tube having an elongated hollow interior provides the molded support beam of the present invention with a combination of reduced weight (relative to a solid support tube or no support tube at all) and increased strength and dimensional stability (relative to no support tube at all). The dimensions of the elongated support tube are selected so as to provide a combination of minimum weight and maximum strength. The wall thickness of the elongated support tube may be substantially uniform or non-uniform along its length. For example, when non-uniform, the wall thickness of the support tube may be thicker towards the ends (e.g., thickening conically toward the ends) and thinner in the center; or thicker in the center (e.g., thickening conically toward the center) and thinner at the ends.

Generally, the elongated support tube has a wall thickness of from 3 mm to 12 mm, typically from 4 mm to 10 mm, and more typically from 4 mm to 8 mm. In an embodiment of the present invention, the elongated support tube has a wall thickness of 6.4 mm. If circular, the diameter of the elongated hollow interior of the support tube is typically from 2 cm to 10 cm, more typically from 3 cm to 8 cm, and further typically from 4 cm to 6 cm.

Elongated support tube 74 and elongated hollow interior 77, in an embodiment, each have a substantially square cross-sectional shape, as depicted in the drawings, and as such support tube 74 is a rectatubular support tube 74, and hollow interior 77 is a rectatubular hollow interior 77. Elongated hollow interior 77 (having a substantially square cross-sectional shape) typically has a width 288 (and equivalently a height), between opposing interior surfaces thereof, of from 2 cm to 10 cm, more typically from 3 cm to 8 cm, and further typically from 3 cm to 6 cm. See FIG. 12. In an embodiment of the present invention, elongated hollow interior 77 of elongated rectatubular support tube 74 has a width 288 of 3.75 cm.

The elongated lower portion, the elongated upper portion and each elongated flange of the molded support beam of the present invention are independently fabricated from a plastic material. The plastic material of the elongated lower portion, the elongated upper portion and each elongated flange may in each case be independently selected from thermoset plastic materials, thermoplastic materials and combinations thereof. As used herein and in the claims the term "thermoset plastic material" and similar terms, such as "thermosetting or thermosetable plastic materials" means plastic materials having or that form a three dimensional crosslinked network resulting from the formation of covalent bonds between chemically reactive groups, e.g., active hydrogen groups and free isocyanate groups, or between unsaturated groups.

Thermoset plastic materials from which the plastic material of the elongated lower portion, the elongated upper portion and each elongated flange may be independently selected, include those known to the skilled artisan, e.g., crosslinked polyurethanes, crosslinked polyepoxides, crosslinked polyesters and crosslinked polyunsaturated polymers. The use of thermosetting plastic materials typically involves the art-recognized process of reaction injection molding. Reaction injection molding typically involves, as is known to the skilled artisan, injecting separately, and preferably simultaneously, into a mold, for example: (i) an active hydrogen functional component (e.g., a polyol and/or polyamine); and (ii) an isocyanate functional component (e.g., a diisocyanate such as toluene diisocyanate, and/or dimers and trimers of a diisocyanate such as toluene diisocyanate). The filled mold may optionally be heated to ensure and/or hasten complete reaction of the injected components.

As used herein and in the claims, the term "thermoplastic material" and similar terms, means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials from which the plastic material of the elongated lower portion, the elongated upper portion and each elongated flange which may be independently selected include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-stryrene-acrylate and combinations thereof (e.g., blends and/or alloys of at least two thereof).

In an embodiment of the present invention, the thermoplastic material of each of the elongated lower portion, the elongated upper portion and each elongated flange is independently selected from thermoplastic polyolefins. As used herein and in the claims, the term "polyolefin" and similar terms, such as "polyalkylene" and "thermoplastic polyolefin", means polyolefin homopolymers, polyolefin copolymers, homogeneous polyolefins and/or heterogeneous polyolefins. For purposes of illustration, examples of a polyolefin copolymers include those prepared from ethylene and one or more $C_3$-$C_{12}$ alpha-olefins, such as 1-butene, 1-hexene and/or 1-octene.

The polyolefins, from which the thermoplastic material of the elongated lower portion, the elongated upper portion and each elongated flange may in each case be independently selected, include heterogeneous polyolefins, homogeneous polyolefins, or combinations thereof. The term "heterogeneous polyolefin" and similar terms means polyolefins having a relatively wide variation in: (i) molecular weight amongst individual polymer chains (i.e., a polydispersity index of greater than or equal to 3); and (ii) monomer residue distribution (in the case of copolymers) amongst individual polymer chains. The term "polydispersity index" (PDI) means the ratio of $M_w/M_n$, where $M_w$ means weight average molecular weight, and $M_n$ means number average molecular weight, each being determined by means of gel permeation chromatography (GPC) using appropriate standards, such as polyethylene standards. eterogeneous polyolefins are typically prepared by means of Ziegler-Natta type catalysis in heterogeneous phase.

The term "homogeneous polyolefin" and similar terms means polyolefins having a relatively narrow variation in: (i) molecular weight amongst individual polymer chains (i.e., a polydispersity index of less than 3); and (ii) monomer residue distribution (in the case of copolymers) amongst individual polymer chains. As such, in contrast to heterogeneous polyolefins, homogeneous polyolefins have similar chain lengths amongst individual polymer chains, a relatively even distribution of monomer residues along polymer chain backbones, and a relatively similar distribution of monomer residues amongst individual polymer chain backbones. Homogeneous polyolefins are typically prepared by means of single-site, metallocene or constrained-geometry catalysis. The monomer residue distribution of homogeneous polyolefin copolymers may be characterized by composition distribution breadth index (CDBI) values, which are defined as the weight percent of polymer molecules having a comonomer residue content within 50 percent of the median total molar comonomer content. As such, a polyolefin homopolymer has a CDBI value of 100 percent. For example, homogenous polyethylene/alpha-olefin copolymers typically have CDBI values of greater than 60 percent or greater than 70 percent. Composition distribution breadth index values may be determined by art recognized methods, for example, temperature rising elution fractionation (TREF), as described by Wild et al, Journal of Polymer Science, Poly. Phys. Ed., Vol. 20, p. 441 (1982), or in U.S. Pat. No. 4,798,081, or in U.S. Pat. No. 5,089,321. An example of homogeneous ethylene/alpha-olefin copolymers are SURPASS polyethylenes, commercially available from NOVA Chemicals Inc.

The plastic material of the elongated lower portion, the elongated upper portion and each elongated flange may in each case independently and optionally include a reinforcing material selected, for example, from glass fibers, glass beads, carbon fibers, metal flakes, metal fibers, polyamide fibers (e.g., KEVLAR polyamide fibers), cellulosic fibers, nanoparticulate clays, talc and mixtures thereof. If present, the reinforcing material is typically present in a reinforcing amount, e.g., in an amount of from 5 percent by weight to 60 or 70 percent by weight, based on the total weight of the plastic material. The reinforcing fibers, and the glass fibers in particular, may have sizings on their surfaces to improve miscibility and/or adhesion to the plastic materials into which they are incorporated, as is known to the skilled artisan.

In an embodiment of the invention, the reinforcing material is in the form of fibers (e.g., glass fibers, carbon fibers, metal fibers, polyamide fibers, cellulosic fibers and combinations of two or more thereof). The fibers typically have lengths (e.g., average lengths) of from 0.5 inches to 4 inches (1.27 cm to 10.16 cm). The elongated lower portion, elongated upper portion and each elongated flange of the molded support beam of the present invention may each independently include fibers having lengths that are at least 50 or 85 percent of the lengths of the fibers that are present in the feed materials from which the molded support beam is (or portions thereof are) prepared, such as from 0.25 inches to 2 or 4 inches (0.64 cm to 5.08 or 10.16 cm). The average length of fibers present in the molded support beam (or portions thereof) may be determined in accordance with art recognized methods. For example, the molded support beam (or portions thereof) may be pyrolyzed to remove the plastic material, and the remaining or residual fibers microscopically analyzed to determine their average lengths, as is known to the skilled artisan.

Fibers are typically present in the plastic materials of the elongated lower portion, the elongated upper portion, and each elongated flange in amounts independently from 5 to 70 percent by weight, 10 to 60 percent by weight, or 30 to 50 percent by weight (e.g., 40 percent by weight), based on the total weight of the plastic material (i.e., the weight of the plastic material, the fiber and any additives). Accordingly, the elongated lower portion, the elongated upper portion, and each elongated flange of the molded support beam of the present invention may each independently include fibers in amounts of from 5 to 70 percent by weight, 10 to 60 percent by weight, or 30 to 50 percent by weight (e.g., 40 percent by weight), based on the total weight of the particular portion (or combinations of portions thereof that include reinforcing fibers).

The fibers may have a wide range of diameters. Typically, the fibers have diameters of from 1 to 20 micrometers, or more typically from 1 to 9 micrometers. Generally each fiber comprises a bundle of individual filaments (or monofilaments). Typically, each fiber is composed of a bundle of 10,000 to 20,000 individual filaments.

Typically, the fibers are uniformly distributed throughout the plastic material. During mixing of the fibers and the plastic material, the fibers generally form bundles of fibers typically comprising at least 5 fibers per fiber bundle, and preferably less than 10 fibers per fiber bundle. While not intending to be bound by theory, it is believed based on the evidence at hand, that fiber bundles containing 10 or more fibers may result in a molded support beam having undesirably reduced structural integrity. The level of fiber bundles containing 10 or more fibers per bundle, may be quantified by determining the Degree of Combing present within a molded article. The number of fiber bundles containing 10 or more fibers per bundle is typically determined by microscopic evaluation of a cross section of the molded article, relative to the total number of microscopically observable fibers (which is typically at least 1000). The Degree of Combing is calculated using the following equation: 100× ((number of bundles containing 10 or more fibers)/(total number of observed fibers)). Generally, the molded support beam (or portions thereof) has/have a Degree of Combing of less than or equal to 60 percent, and typically less than or equal to 35 percent.

In addition or alternatively to reinforcing material(s), the plastic materials of the elongated lower portion, the elongated upper portion and each elongated flange may in each case independently and optionally include one or more additives. Additives that may be present in the plastic materials of the various portions of the molded support beam include, but are not limited to, antioxidants, colorants, e.g., pigments and/or dyes, mold release agents, fillers, e.g., calcium carbonate, ultraviolet light absorbers, fire retardants and mixtures thereof. Additives may be present in the plastic material of each portion of the molded support beam in functionally sufficient amounts, e.g., in amounts independently from 0.1 percent by weight to 10 percent by weight, based on the total weight of the particular plastic material.

The molded support beam of the present invention may be prepared by art-recognized methods, including, but not limited to, injection molding, reaction injection molding, compression molding and combinations thereof. The molded support beam may be fabricated by a compression molding process that includes: providing a compression mold comprising a lower mold portion and an upper mold portion; forming (e.g., in an extruder) a molten composition comprising plastic material and optionally reinforcing material, such as fibers; introducing, by action of gravity, the molten composition into the lower mold portion; compressively contacting the molten composition introduced into the lower mold portion with the interior surface of the upper mold portion; and removing the molded support beam from the mold. The lower mold portion may be supported on a trolley that is reversibly moveable between: (i) a first station where the molten composition is introduced therein; and (ii) a second station where the upper mold portion is compressively contacted with the molten composition introduced into the lower mold portion.

The lower mold portion may be moved concurrently in time and space (e.g., in x-, y- and/or z-directions, relative to a plane in which the lower mold resides) as the molten composition is gravitationally introduced therein. Such dynamic movement of the lower mold portion provides a means of controlling, for example, the distribution, pattern and/or thickness of the molten composition that is gravitationally introduced into the lower mold portion. Alternatively, or in addition to movement of the lower mold portion in time and space, the rate at which the molten composition is introduced into the lower mold portion may also be controlled. When the molten composition is formed in an extruder, the extruder may be fitted with a terminal dynamic die having one or more reversibly positionable gates through which the molten composition flows before dropping into the lower mold portion. The rate at which the molten composition is gravitationally deposited into the lower mold portion may be controlled by adjusting the gates of the dynamic die.

If different plastic compositions are used to form the elongated lower portion, the elongated upper portion and each elongated flange of the molded support beam, the different plastic compositions may be introduced sequentially or concurrently into a particular portion of the lower mold that corresponds to a particular portion of the molded support beam. For example, a first molten plastic composition may be introduced, at a first station, into that portion of the lower mold which defines the elongated lower portion of the beam, followed by moving the trolley and lower mold to a second station where a second molten plastic composition is introduced into that portion of the lower mold which defines the elongated upper portion of the beam, and then moving the trolley to a third station where a third molten plastic composition is introduced into that portion of the lower mold which defines the elongated flange or flanges. The lower mold, so sequentially filled with first, second and third molten plastic compositions, is then moved, via the trolley, to a fourth station where the upper mold portion is compressively contacted with the plastic materials within the lower mold. Alternatively, the first, second and third molten plastic compositions may be introduced substantially concurrently into those portions of the lower mold that define the elongated lower portion, elongated upper portion and elongated flange(s) of the molded beam, for example by moving the lower mold beneath the terminal ports of three separate extruders.

The compressive force applied to the molten plastic composition introduced into the lower mold portion is typically from 25 psi to 550 psi (1.8 to 38.7 Kg/cm$^2$), more typically from 50 psi to 400 psi (3.5 to 28.1 Kg/cm$^2$), and further typically from 100 psi to 300 psi (7.0 to 21.1 Kg/cm$^2$). The compressive force applied to the molten plastic material may be constant or non-constant. For example, the compressive force applied to the molten plastic material may initially be ramped up at a controlled rate to a predetermined level, followed by a hold for a given amount of time, then followed by a ramp down to ambient pressure at a controlled rate. In addition, one or more plateaus or holds may be incorporated into the ramp up and/or ramp down during compression of the molten plastic material. The molded support beam of the present invention may, for example, be prepared in accordance with the methods and apparatuses described in U.S. Pat. Nos. 6,719,551; 6,869,558; 6,900,547; and 7,208,219.

In an embodiment of the present invention, the elongated lower portion, the elongated upper portion and each elongated flange of the molded support beam are each independently a molded article formed from a molten composition comprising fibers (e.g., glass fibers, carbon fibers, metal fibers, polyamide fibers and/or cellulosic fibers). As used with regard to this particular embodiment of the invention herein and in the claims, the term "molded article" means at least one of the elongated lower portion, the elongated upper portion, and at least one elongated flange. The molten composition is formed from plastic material and feed fibers. The molten composition may be formed by introducing the plastic material and feed fibers sequentially or concurrently into, and optionally at multiple points along the length of, an extruder. The feed fibers have a length of 1.27 cm (0.5 inches) to 10.16 cm (4 inches). The fibers are present in the molded article (e.g., one or more of the elongated lower portion, the elongated upper portion and the elongated flange(s)) in an amount of from 5 percent by weight to 70 percent by weight, based on the total weight of the particular molded article (or portion). The fibers of the molded article (e.g., one or more of the elongated lower portion, the elongated upper portion and the elongated flange(s)) have lengths (e.g., average lengths) that are at least 60% of the lengths (e.g., average lengths) of the feed fibers. In addition, less than 20 percent of the fibers of the molded article are oriented in the same direction.

The elongated support tube of the molded support beam may be fabricated from known suitable self-supporting materials, such as thermoplastic materials, thermoset materials, metals (e.g., ferrous based metals, titanium and aluminum), cellulose based materials, such as wood, ceramics, glass, and combinations thereof. Plastic materials, such as, thermoplastic and/or thermoset materials, from which the elongated support tube may be fabricated, may be selected from those classes and examples as described previously herein with regard to the elongated lower portion, elongated upper portion and flange(s) of the molded support beam. In addition, the plastic materials of the elongated support tube may optionally further include reinforcing materials (e.g., glass fibers) including those classes and examples, and in amounts as described previously herein with regard to the elongated lower portion, elongated upper portion and/or flanges of molded support beam.

In an embodiment of the present invention, the elongated support tube is fabricated from a material selected from thermoset materials, thermoplastic materials, metals and combinations thereof. In a particular embodiment, the elongated support tube is fabricated from at least one metal. Metals from which the elongated support tube may be fabricated include, but are not limited to, iron, steel, nickel, aluminum, copper, titanium and combinations thereof.

The molded support beam of the present invention may have a wide range of dimensions, which depend, at least in part, on the particular application in which the molded support beam is used. Elongated lower portion 11, elongated upper portion 14 and each elongated flange (e.g., 17 and/or 18) of the molded support beam may each independently have a length (e.g., as represented by length 65 of elongated upper portion 14, FIG. 3) of from 180 cm to 7200 cm, more typically from 240 cm to 6000 cm, and further typically from 540 cm to 800 cm. In an embodiment of the present invention, elongated lower portion 11 and elongated upper portion 14 each have a length of 600 cm. Each elongated flange may independently have a length that is less than that of elongated upper portion 14, but typically within the above recited ranges.

Figure 12:
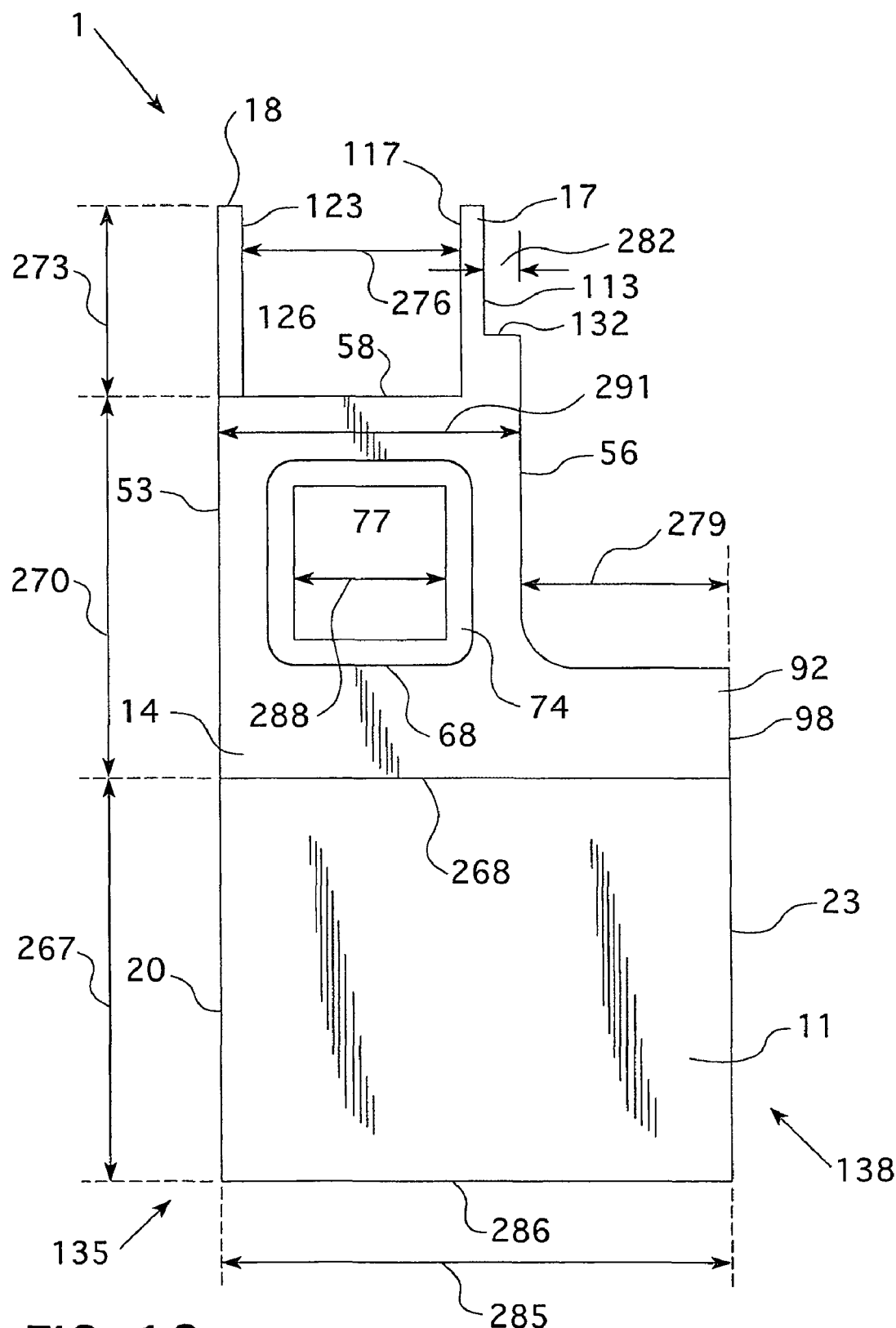
FIG. 12 is the representative end-on view of the left end of the molded support beam of FIG. 2, which is presented for purposes of discussing dimensions of the molded support beam.

With reference to FIG. 12, elongated lower portion 11 and elongated upper portion 14 (including ledge 92 thereof) of the molded support beam may each independently have a width (e.g., as represented by width 285: between first vertical side 20 and second vertical side 23 of elongated lower portion 11; and between first vertical side 53 of elongated upper portion 14 and vertical surface 98 of ledge 92) of from 6 cm to 20 cm, more typically from 10 cm to 16 cm, and further typically from 12 cm to 14 cm. In an embodiment of the present invention, elongated lower portion 11 and elongated upper portion 14 (including ledge 92 thereof) each have a width 285 of 12.5 cm.

Not including the ledge 92, elongated upper portion 14 typically has a width 291 from first vertical side 53 to second vertical side 56 of from 3 cm to 12 cm, more typically from 6 to 10 cm, and further typically from 7 to 8 cm. In an embodiment of the present invention, elongated upper portion 14 has a width 291 (excluding ledge 92) of 7.5 cm.

With further reference to FIG. 12, elongated lower portion 11 may have a height 267 (from base 286 to upper limit 268 of elongated lower portion 11) of from 6 cm to 20 cm, more typically from 10 cm to 16 cm, and further typically from 12 cm to 14 cm. In an embodiment of the present invention, elongated lower portion 11 has a height 267 of 12.5 cm. Elongated upper portion 14 may have a height 270 (from lower limit 268 to upper surface 59 of elongated upper portion 14) of from 3 cm to 10 cm, more typically from 4 cm to 9 cm, and further typically from 5 cm to 8 cm. In an embodiment of the present invention, elongated upper portion 14 has a height 270 of 6.25 cm. Each elongated flange (e.g., 17 and/or 18) may independently have a height 273 (relative to upper surface 59 of elongated upper portion 14) of from 2 cm to 10 cm, typically from 4 cm to 9 cm, and further typically from 5 cm to 8 cm. In an embodiment of the present invention, each elongated flange has a height 273 that is substantially the same, e.g., a height 273 of 5 cm.

When the molded support beam of the present invention includes two or more elongated flanges, each elongated channel (e.g., 126) defined by each pair of neighboring elongated flanges (e.g., 17 and 18) typically has a width 276, between the interior vertical surfaces thereof (e.g., between interior vertical surface 123 of elongated flange 18 and interior vertical surface 117 of elongated flange 17) of from 1 cm to 10 cm, more typically from 4 cm to 9 cm, and further typically from 5 cm to 8 cm. In an embodiment of the present invention, elongated channel 126 has a width 276 of 5 cm.

Ledge 92 of elongated upper portion 14 typically extends a distance 279, horizontally outward from second vertical side 56, of from 3 cm to 12 cm, more typically from 4 cm to 10 cm, and further typically from 5 cm to 8 cm. In an embodiment of the present invention, ledge 92 of elongated upper portion 14 extends a distance 279, horizontally outward from second vertical side 56, of 5 cm.

Ledge 132 of elongated flange 17 typically extends a distance 282, horizontally outward from exterior vertical surface 113 of flange 17, of from 0 cm to 1 cm, more typically from 1 mm to 8 mm, and further typically from 2 mm to 6 mm. In an embodiment of the present invention, ledge 132 of elongated flange 17 extends a distance 282, horizontally outward from exterior vertical surface 113 of flange 17, of 6.25 mm.

As discussed previously herein, elongated support tube 74 may extend less than (not shown), equivalently to, or more than (not shown) length 65 of elongated upper portion 14. Elongated support tube 74 may have a length of from 180 cm to 7400 cm, more typically from 240 cm to 6000 cm, and further typically from 540 cm to 800 cm. In an embodiment of the present invention, elongated support tube 74 has a length that is substantially equivalent to length 65 of elongated upper portion 14 (and, accordingly, does not extend beyond first end 80 or second end 83 of elongated upper portion 14), e.g., having a length of 600 cm.

The molded support beam of the present invention may be used as a support beam (e.g., a lower support beam) in numerous structures. Examples of such structures include, but are not limited to: shipping containers, such as ISO Containers (e.g., having lengths of 6.1 m, 12.2 m, 13.7 m, 14.6 m or 16.2 m); temporary housing structures; permanent housing structures, temporary storage structures; permanent storage structures; floor structures; floor covering structures; and base support structures for heavy equipment, such as compressors and electric generators.

The present invention has been described with reference to specific details of particular embodiments thereof. It is not intended that such details be regarded as limitations upon the scope of the invention except insofar as and to the extent that they are included in the accompanying claims.

What is claimed is:

1. A molded support beam comprising:
   (a) an elongated lower portion having a first vertical side, a second vertical side and a longitudinal axis, and comprising,
   at least three supports, each support extending along a line parallel to said longitudinal axis, each support being separate and spaced from each other support, each support extending downwardly from said lower portion, each support having and being a neighboring support, each support and its neighboring support forming a pair of neighboring supports, each pair of neighboring supports together defining a transverse opening, said elongated lower portion having at least two transverse openings, each transverse opening having an open bottom,
   wherein at least one pair of neighboring supports comprises a first support and a second support, said first support having an arcuate surface, said second support having an arcuate surface, said arcuate surface of said first support facing said arcuate surface of said second support and together defining an arched transverse opening, said transverse openings comprising at least one arched transverse opening;
   (b) an elongated upper portion having a first vertical side, a second vertical side, an upper surface, a longitudinal axis and a length, and comprising,
   a longitudinal passage having a longitudinal axis and extending substantially the length of said elongated upper portion, the longitudinal axis of said longitudinal passage and the longitudinal axis of said elongated upper portion lying directly above the transverse opening of said at least three supports and all being substantially parallel, and
   a ledge extending substantially horizontally outward from said second vertical side of said elongated upper portion, said ledge having an upper surface;
   (c) an elongated support tube residing within said longitudinal passage of said elongated upper portion, said elongated support tube having an elongated hollow interior; and
   (d) at least one elongated flange extending upwardly from said elongated upper surface of said elongated upper portion, each elongated flange being substantially parallel with and directly above the longitudinal axis of said elongated upper portion,
   wherein said elongated lower portion, said elongated upper portion and each elongated flange are substantially continuous, and the longitudinal axis of said elongated lower portion and the longitudinal axis of said elongated upper portion are substantially parallel.

2. The molded support beam of claim 1 wherein at least two of said transverse openings are dimensioned to receive a lifting device there-through.

3. The molded support beam of claim 2 wherein each transverse opening that is dimensioned to receive a lifting device there-through is defined by substantially continuous surfaces.

4. The molded support beam of claim 1 wherein each transverse opening is oriented substantially orthogonal to the longitudinal axis of said elongated lower portion.

5. The molded support beam of claim 1 wherein at least one support of said elongated lower portion has a hollow interior portion and an open bottom that is downwardly facing.

6. The molded support beam of claim 1 wherein at least one support of said elongated lower portion comprises a plurality of internal ribs defining internal hollow portions, said internal ribs being integral with said support.

7. The molded support beam of claim 6 wherein said internal hollow portions have open lower portions that are downwardly facing.

8. The molded support beam of claim 1 wherein said elongated lower portion comprises five supports and four transverse openings.

9. The molded support beam of claim 1 wherein said elongated lower portion comprises eight supports and seven transverse openings.

10. The molded support beam of claim 1 wherein said elongated lower portion comprises,
    an even number of said supports, said supports being substantially symmetrically positioned along said elongated lower portion, and comprise,
    a first terminal pair of neighboring supports that together define a first terminal arched transverse opening,
    a central pair of neighboring supports that together define a central arched transverse opening, and
    a second terminal pair of neighboring supports that together define a second terminal arched transverse opening,
    further wherein said central pair of neighboring supports is positionally interposed between said first terminal pair of neighboring supports and said second terminal pair of neighboring supports, and said central arched transverse opening is positionally interposed between said first terminal arched transverse opening and said second terminal arched transverse opening.

11. The molded support beam of claim 1 wherein said elongated support tube is fixedly held within said longitudinal passage.

12. The molded support beam of claim 11 wherein said support tube is fixed within said longitudinal passage during molding of said elongated upper portion of said molded support beam.

13. The molded support beam of claim 1 wherein said longitudinal passage, said elongated support tube and said elongated hollow interior of said support tube each independently have a cross-sectional shape selected from the group consisting of circular shapes, oval shapes, polygonal shapes, irregular shapes and combinations thereof.

14. The molded support beam of claim 13 wherein said longitudinal passage, said elongated support tube and said elongated hollow interior of said support tube each independently have a cross-sectional shape selected from rectangular shapes.

15. The molded support beam of claim 1 wherein said ledge of said elongated upper portion is supported by said elongated lower portion.

16. The molded support beam of claim 1 wherein said ledge of said elongated upper portion extends substantially the length of said elongated upper portion.

17. The molded support beam of claim 1 wherein said molded support beam comprises two of said elongated flanges, each elongated flange having an interior surface, the interior surface of each elongated flange and the upper surface of said elongated upper portion together defining an elongated channel having a longitudinal axis, the longitudinal axis of said elongated channel being substantially parallel with the longitudinal axis of said elongated upper portion.

18. The molded support beam of claim 1 wherein one of the at least one elongated flanges comprises a ledge extending substantially horizontally outward from an exterior surface of said elongated flange towards said second vertical side of said elongated upper portion.

19. The molded support beam of claim 1 wherein said elongated lower portion, said elongated upper portion and each elongated flange are each fabricated from a plastic material selected independently from the group consisting of thermoset plastic material, thermoplastic material and combinations thereof.

20. The molded support beam of claim 19 wherein said elongated lower portion, said elongated upper portion and each elongated flange are each fabricated from a thermoplastic material selected independently from the group consisting of thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth) acrylates, thermoplastic acrylonitrile-butadiene-styrene, thermoplastic styrene-acrylonitrile, thermoplastic acrylonitrile-stryene-acrylate and combinations thereof.

21. The molded support beam of claim 19 wherein the plastic material of at least one of said elongated lower portion, said elongated upper portion and each elongated flange is reinforced with a reinforcing material selected independently from the group consisting of glass fibers, glass beads, carbon fibers, metal flakes, metal fibers, polyamide fibers, cellulosic fibers, nanoparticulate clays, talc and mixtures thereof.

22. The molded support beam of claim 19 wherein said elongated lower portion, said elongated upper portion and each elongated flange are each independently a molded article formed from a molten composition comprising fibers, said molten composition being formed from plastic material and feed fibers having a length of 1.27 cm to 10.16 cm,
    the fibers being present in said molded article in an amount of from 5 percent by weight to 70 percent by weight, based on the total weight of said molded article,
    the fibers of said molded article have lengths that are at least 60% of the lengths of said feed fibers, and
    less than 20% of the fibers of said molded article are oriented in the same direction.

23. The molded support beam of claim 1 wherein said elongated support tube is fabricated from a material selected from the group consisting of thermoset materials, thermoplastic materials, metals and combinations thereof.

24. The molded support beam of claim 23 wherein said elongated support tube is fabricated from at least one metal.

25. The molded support beam of claim 24 wherein the metal, from which said elongated support tube is fabricated, is selected from the group consisting of iron, steel, nickel, aluminum, copper, titanium and combinations thereof.

* * * * *